US009753294B2

(12) United States Patent
Hardison

(10) Patent No.: US 9,753,294 B2
(45) Date of Patent: Sep. 5, 2017

(54) EYEWEAR SYSTEM, APPARATUS AND METHOD FOR STEREOSCOPICALLY VIEWING MOTION PICTURES

(71) Applicant: Leslie C. Hardison, Cape Coral, FL (US)

(72) Inventor: Leslie C. Hardison, Cape Coral, FL (US)

( * ) Notice: Subject to any disclaimer, the term of this patent is extended or adjusted under 35 U.S.C. 154(b) by 0 days.

(21) Appl. No.: 14/616,870

(22) Filed: Feb. 9, 2015

(65) Prior Publication Data

US 2016/0231578 A1    Aug. 11, 2016

(51) Int. Cl.
*G02B 27/22* (2006.01)
*G02C 7/02* (2006.01)
*G02C 7/14* (2006.01)

(52) U.S. Cl.
CPC ......... *G02B 27/2221* (2013.01); *G02B 27/22* (2013.01); *G02B 27/2242* (2013.01); *G02C 7/02* (2013.01); *G02C 7/14* (2013.01)

(58) Field of Classification Search
CPC ............................ G02B 27/22; G02B 27/2242
USPC ........ 359/462, 466, 467, 471, 472, 478, 479
See application file for complete search history.

(56) References Cited

U.S. PATENT DOCUMENTS

| | | | |
|---|---|---|---|
| 3,195,145 A | | 7/1965 | Tisher et al. |
| 3,628,854 A | | 12/1971 | Jampolsky |
| 3,744,882 A | | 7/1973 | Forster, Jr. |
| 3,895,867 A | * | 7/1975 | Lo .......................... G03B 35/00 348/E13.029 |
| 4,140,370 A | | 2/1979 | Snaper et al. |
| 4,353,621 A | | 10/1982 | Geer et al. |
| 4,429,951 A | * | 2/1984 | Hirano .......................... 359/478 |
| 4,464,015 A | * | 8/1984 | Shafer ................ G02B 27/2242 359/472 |
| 4,597,634 A | * | 7/1986 | Steenblik ...................... 359/478 |
| 4,601,545 A | | 7/1986 | Kern |
| 4,717,239 A | * | 1/1988 | Steenblik ................. G02B 5/04 348/E13.033 |
| 4,772,094 A | * | 9/1988 | Sheiman .................. G02B 3/08 348/E13.028 |
| 4,960,326 A | | 10/1990 | Dauvergne |
| 5,002,364 A | * | 3/1991 | Steenblik ................. G02B 5/04 348/E13.033 |
| 5,177,510 A | | 1/1993 | Peters et al. |
| 5,362,238 A | | 11/1994 | Slavin |
| 5,430,474 A | | 7/1995 | Hines |
| 5,475,419 A | * | 12/1995 | Carbery ............. H04N 13/0048 348/51 |

(Continued)

*Primary Examiner* — William R Alexander
(74) *Attorney, Agent, or Firm* — Charles F. Meroni, Jr.; Meroni & Meroni, P.C.

(57) ABSTRACT

Moving pictures, as exemplified by ordinary television programming, are viewed stereoscopically when viewed using a special eyewear apparatus which includes a prismatic lens construction. The three dimensional effect is produced by the design of the eyewear to redirect the visual tracking of one or both eyes away from the normal convergent angle used when viewing display screens to a wider angle, which is normally associated with viewing objects at a greater distance that the display screen. This causes the eyes to perceive two distinct views of the single picture on the screen, which are interpreted by the viewer's brain, not as two laterally displaced pictures, but as a single picture with elements of depth, or a 3D picture.

20 Claims, 14 Drawing Sheets

(56) References Cited

U.S. PATENT DOCUMENTS

| | | | |
|---|---|---|---|
| 5,489,953 A | | 2/1996 | Griffith |
| 5,521,653 A | | 5/1996 | Anderson |
| 5,561,480 A | | 10/1996 | Capes |
| 5,614,941 A | | 3/1997 | Hines |
| 5,675,398 A | | 10/1997 | Moore |
| 5,680,250 A | * | 10/1997 | White .......................... 359/479 |
| 5,886,817 A | * | 3/1999 | Aalto ....................... G02B 1/06 |
| | | | 359/462 |
| 6,003,990 A | | 12/1999 | Einhorn |
| 6,145,983 A | | 11/2000 | Schiffer |
| 6,206,521 B1 | | 3/2001 | Kindschub |
| 6,352,345 B1 | | 3/2002 | Zolten |
| 6,513,928 B1 | | 2/2003 | Moore |
| 6,934,084 B2 | * | 8/2005 | Pandya ................... G02C 7/14 |
| | | | 351/159.58 |
| 2003/0076279 A1 | | 4/2003 | Schkolnik |
| 2003/0133191 A1 | | 7/2003 | Morita et al. |
| 2005/0012814 A1 | | 1/2005 | Shen |
| 2005/0190341 A1 | | 9/2005 | Russomagno et al. |
| 2006/0201047 A1 | * | 9/2006 | Lowrey, III ..................... 42/122 |
| 2007/0097316 A1 | * | 5/2007 | Peli .......................... G02C 7/14 |
| | | | 351/159.17 |
| 2009/0219538 A1 | * | 9/2009 | Myrick .............. G01N 21/4738 |
| | | | 356/445 |
| 2009/0244266 A1 | | 10/2009 | Brigham |
| 2010/0002193 A1 | | 1/2010 | Hines |
| 2012/0081783 A1 | * | 4/2012 | Daly .......................... 359/464 |
| 2013/0128014 A1 | * | 5/2013 | Hardison .............. H04N 13/04 |
| | | | 348/54 |
| 2013/0222757 A1 | | 8/2013 | Klein et al. |
| 2014/0177051 A1 | * | 6/2014 | Kopko ................... G02B 27/24 |
| | | | 359/479 |
| 2014/0285886 A1 | * | 9/2014 | DePalma ..................... 359/466 |

\* cited by examiner

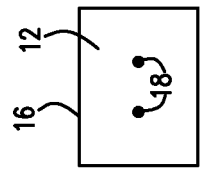
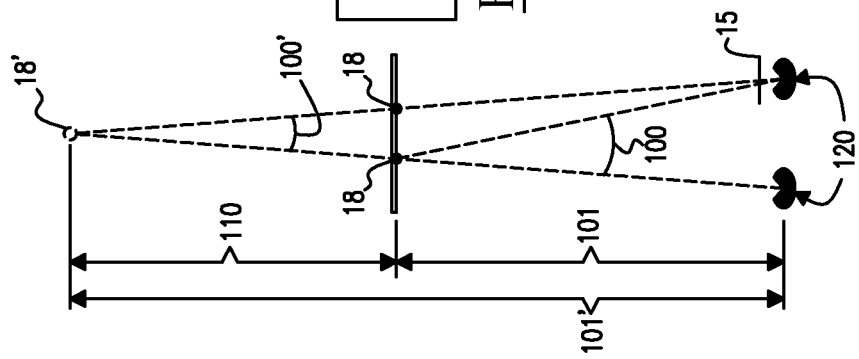
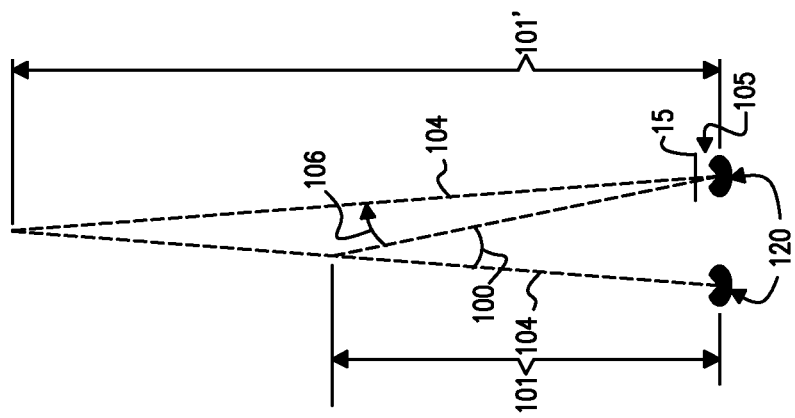
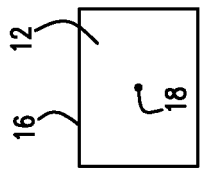
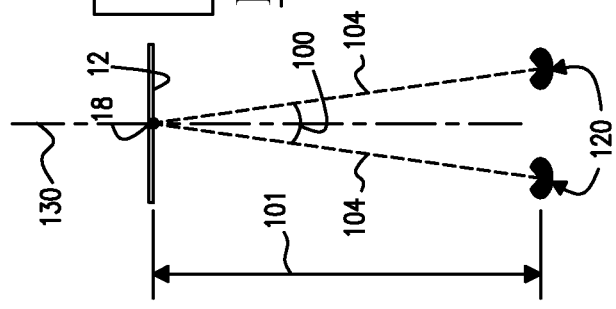

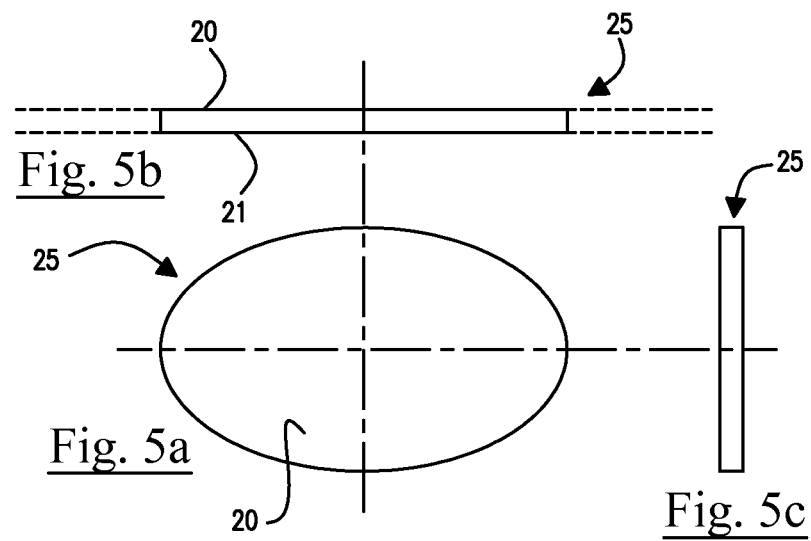
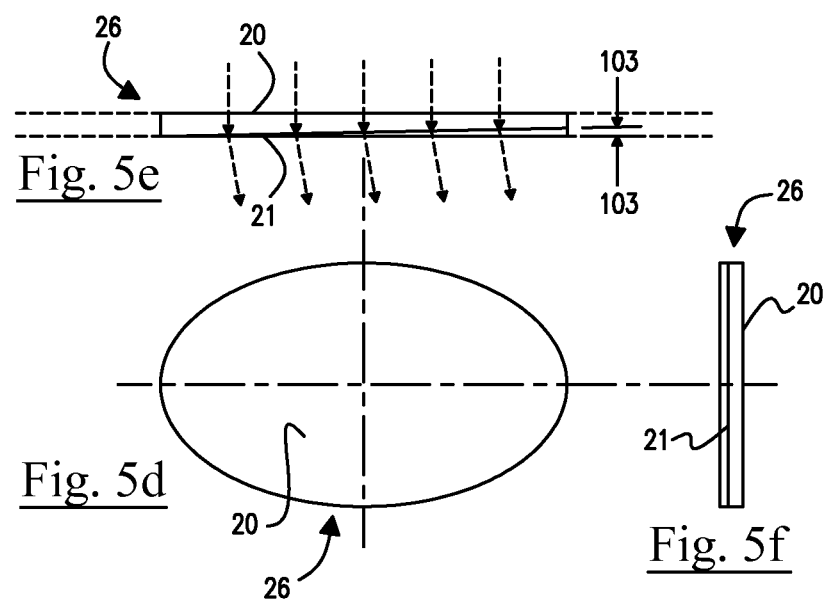

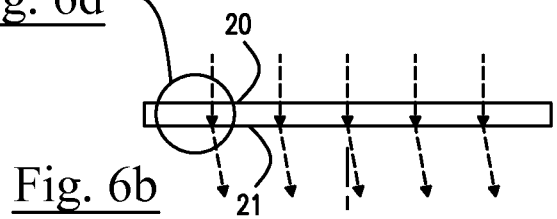
Fig. 6b
Fig. 6d
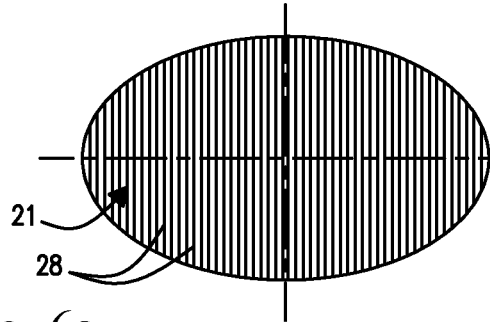
Fig. 6a
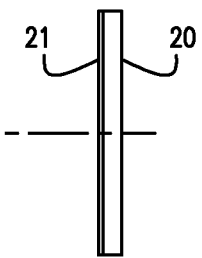
Fig. 6c
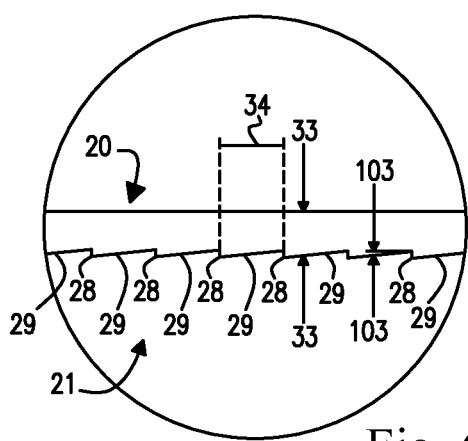
Fig. 6d

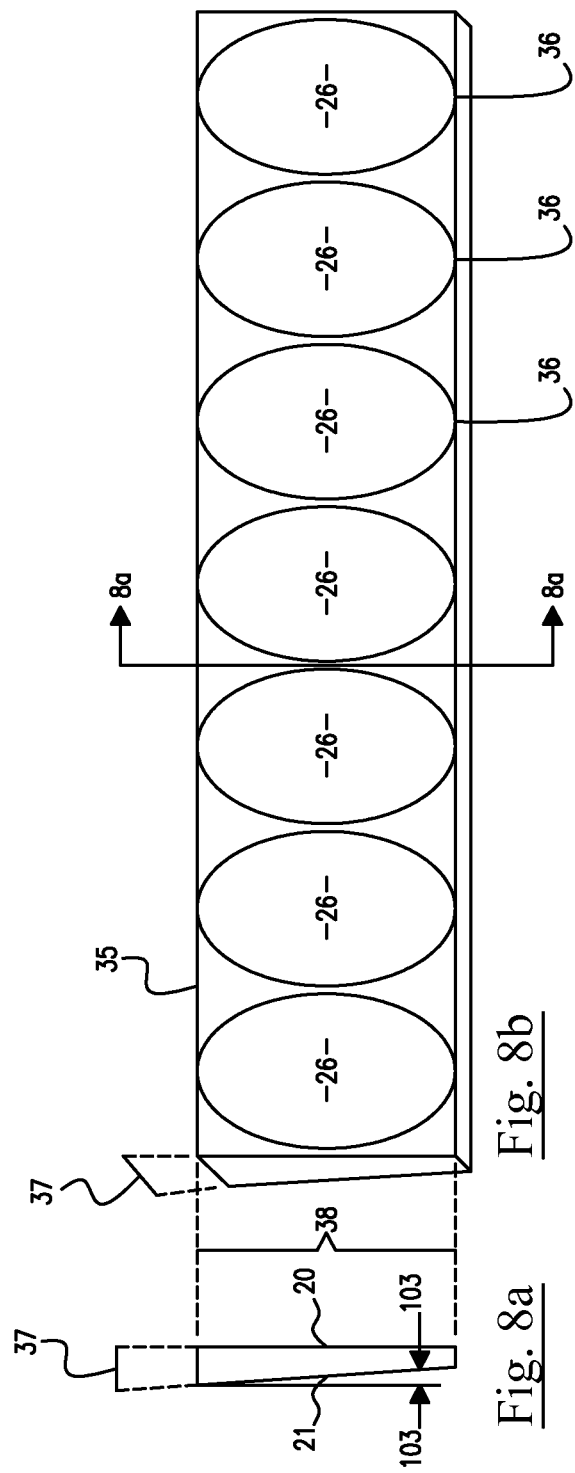

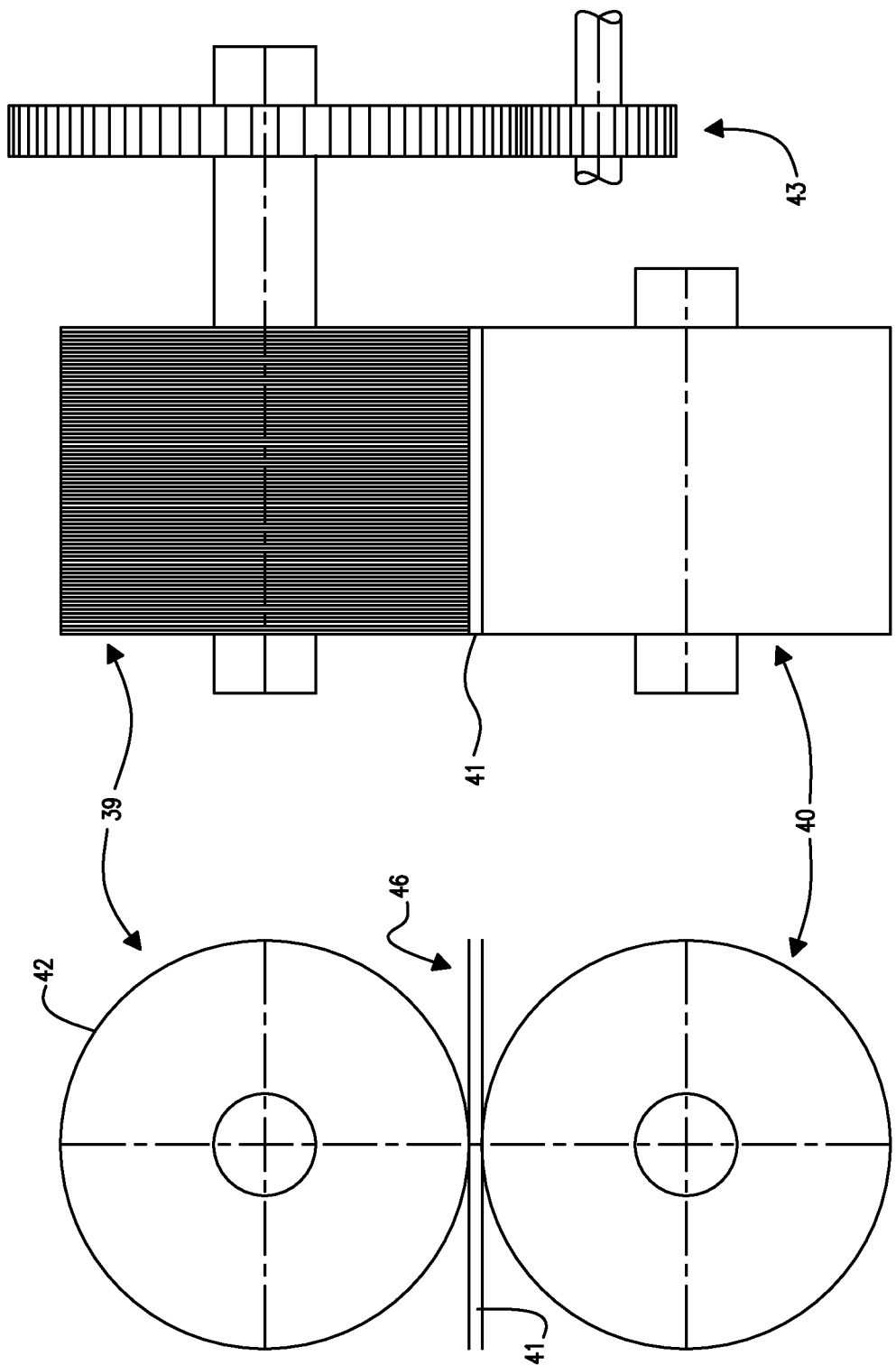

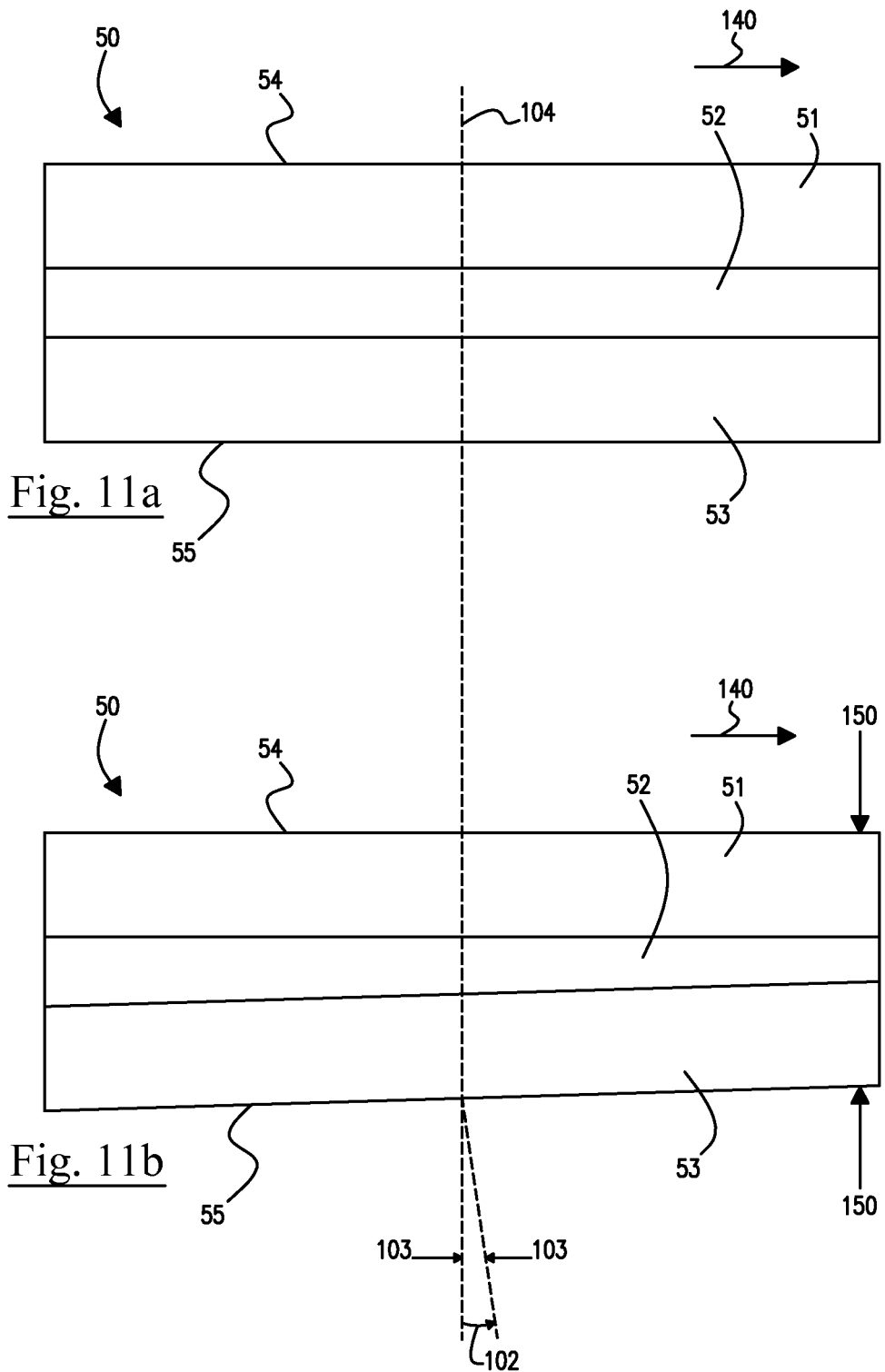

EYEWEAR SYSTEM, APPARATUS AND METHOD FOR STEREOSCOPICALLY VIEWING MOTION PICTURES

BACKGROUND OF THE INVENTION

Field of the Invention

The present invention generally relates to television technology, and more particularly, a simple and relatively inexpensive eyewear apparatus or construction and method for viewing television-based programming or similar other visual moving picture type material such as movies in three-dimensions with the perception of depth added to the two-dimensional picture actually displayed without the requirement of specialized formatting of the visual material or the use of specialized electronic equipment.

Description of Prior Art

Stereoscopy (also called stereoscopic or three-dimensional (3-D) imaging) refers to a technique for creating or enhancing the illusion of depth in an image by presenting two (2) two-dimensional, offset images separately to the left and right eye of the viewer. Both of the two-dimensional, offset images are then combined in the brain to give the perception of three-dimensional depth. Four general strategies have been used to accomplish stereoscopic imaging, three of which employ specialized eyewear, and one of which requires no eyewear.

Those requiring special eyewear are: (1) recording and projecting simultaneously left and right images through filters of different colors, and providing the viewer with glasses using colored lenses of filters to allow each eye to see only the portion of the dual picture taken with the appropriate camera. (2) recording and projection of two distinct images, made by using dual cameras, displaying the left and right images alternately on the television of movie screen, and providing a means, such as electronic shutter glasses or circularly polarized glasses to direct separate left and right camera images to the left and right eye of the viewer.

(3) Utilizing ordinary television pictures taken with a single camera, but shown on a modified television set with the capability of presenting viewing frames at least twice the normal rate (120 Hz vs. 60 Hz) with internal software which presents every second frame altered by a very slight horizontal offset, which simulates much of the difference the two eyes would see if viewing the same scene from an intermediate distance. Again, shutter glasses are used to permit the left eye to see on the unaltered scene, while the right eye sees only the slightly shifted scene.

The method of permitting three-dimensional effects without special eyewear in special cameras and hand held devices utilized two cameras, and produces two images internally. These are viewed on a screen which is composed of tiny vertical sections arranged at such an angle to each other that the left eye can only see vertical elements on which the left picture is visible, and the right eye can see only the picture intended for the right eye.

No special glasses are worn by the viewer, but the technique is only usable when the distance from the viewer to the complex screen is on the order of 20 inches or so. At closer distances both eyes can see both sets of vertical elements, and at much greater distances, both eyes see the same set of elements. In either of these cases there is no three-dimensional effect created, so the method is not directly applicable to television sets or movie theater presentations.

The art of enabling viewers to view motion pictures without the requirement for, or the use of specialized eyewear reportedly dates from the 1930's. In this regard, the reader is directed to U.S. Patent Application Publication No. 2007/0103546, authored by Collender et al., who provide a fairly decent historical synopsis for the history of glasses-free three-dimensional motion picture technology without glasses. The reader is thus invited to inspect said publication for further information regarding the historical development of three-dimensional motion picture viewing independent of eyewear.

Other patent-related disclosures illustrative of the pertinent art relating to the subject invention are briefly described hereinafter. U.S. Pat. No. 3,195,145 ('145 patent), issued to Tisher et al., for example, discloses a corrective lens system comprising a transparent protective lens of major dimension fabricated of synthetic plastic material, said protective lens having a body portion dimensioned to overlie the orbital region and being substantially curvilinear in cross section with a concave posterior surface, said protective lens having an annular lip portion on the posterior surface of said body portion and integral therewith, said lip portion being spaced inwardly from the periphery of said body portion and projecting posteriorly therefrom; and a corrective lens releasably mounted within said lip portion, said lip portion providing a seal about the periphery of said corrective lens and the underlying surface of the body portion to prevent contamination and soiling of the opposed surfaces thereof, said body portion of said protective lens being continuous and extending across the annular lip portion and the anterior surface of said corrective lens.

The stated primary objective of the '145 patent is to provide a corrective lens system including a protective lens of major dimension adapted to reduce substantially the likelihood of physical and light trauma to the eye and a corrective lens of lesser dimension affixed thereto which will permit facile variation of the degree and nature of correction. More specifically, a corrective lens system is provided to provide protection to the orbital region and facile, variable correction to the eye following surgical procedures thereon despite the incorporation of lenses and high corrective factors. The apparent objective, however, is to simply permit the use of replaceable corrective lenses by attaching a protective lens to the back of transparent pair of plain, non-corrective lenses.

U.S. Pat. No. 3,628,854 ('854 patent), which issued to Jampolsky, discloses a Flexible Fresnel Refracting Membrane Adhered to Opthalmic Lens. The '854 patent describes a thin, fully conformable, plastic membrane which can be applied and made to adhere with finger pressure, to spectacle lenses for quickly and impermanently changing one or more optical characteristics of the spectacle lenses. The membrane may be embossed on one of its surfaces to form a Fresnel-type lens or prism structure to introduce a deviation of the light ray, may be partially or entirely tinted to pass only certain wavelengths of light, may be diffused, or blurred uniformly or differentially, may have selective opaqued or transmitting areas or a combination thereof.

U.S. Pat. No. 4,140,370 ('370 patent), which issued to Snaper et al., discloses Planar Optical Viewing and Lenses. The '370 patent discloses an apparatus for producing a simulated three-dimensional psycho-image from a conventional two-dimensional image comprises a screen of transparent material having integral, alternate layers of materials with varying optical properties which enhance image contrast and provide an image bisection to produce an illusion of a three dimensional scene without the need for supplemental viewing glasses or similar devices. Alternate embodiments simulate Fresnel lens performance and provide color conversion.

U.S. Pat. No. 4,960,326 ('326 patent), which issued Dauvergne, discloses Lenticular Eyewear and Method of Fabrication. The '326 patent discloses a lenticular lens for eyewear and method for making the same, the lens being formed with a curved substrate having a plurality of lentoid impressions formed preferably on the inner surface of the substrate by a mold that includes curved, opposed mold pieces, one mold piece having an inset with parallel posts forming a composite face that is ground to a predetermined first curvature for optical correction, and then reoriented by sliding the posts to a predetermined second curvature complimentary to curvature of the opposed mold piece for imprinting thin lens blanks with multiple lentoid impressions for lightweight recreational eyewear.

U.S. Pat. No. 5,177,510 ('510 patent), which issued Peters et al., discloses Alignment Eyeglasses. The '510 patent discloses eyeglasses to aid a wearer, especially athletes or participants in sports, to diminish the input from his or her occulo-vestibular reflexes and provide immediate visual feedback concerning alignment while he or she is performing any motor coordinated skill or movement. More particularly, the eyeglasses have one or more substantially straight visible transparent lines on one or both of the eyepieces which appear to be superimposed on the view through the line or lines.

Each line is substantially parallel to the horizontal or vertical axis of its eyepiece. This line or lines enable the wearer of the eyeglasses to readily check alignment of the body, head, hands and/or a held object with a viewed object, e.g. a golf ball, a pitched baseball, a bowling pin, a basketball, etc. and aid the wearer to make alignment corrections if necessary. The lines may be clear or tinted and defined by tinted areas formed by pigments penetrating to a very shallow depth from only one of the front and back surfaces of the corresponding eyepiece. A simplified process is presented for tinting those areas.

U.S. Pat. No. 5,362,238 ('238 patent), which issued to Slavin, discloses a Method for Driver Education that Mimics Intoxication. The '238 patent describes a new realistic, inexpensive, adaptable, and portable driver education method that mimics the effects of intoxication in the participants through utilization of a simplified optics device in the form of specialized eyeglasses having binocular, manually-spinnable Fresnel prism lenses.

The spinnable optics device simulates most of the toxic effects on the central nervous system which are induced by excess alcohol and/or drugs of abuse, resulting in distorted vision and spatial disorientation in the wearer. The driver education method involves the participants wearing the specialized eyeglasses while performing various ambulatory end non-ambulatory tasks.

U.S. Pat. No. 5,561,480 ('480 patent), which issued to Capes, discloses Keyboard Practice Glasses. The '480 patent describes glasses to be worn over the eyes of a student who is learning to sight-read sheet music, which completely prevent the keyboard student from accidentally looking down at his hands on the keyboard while allowing the student full view of the sheet music. The glasses comprise paired lens portions each of which is divided substantially in half to produce a clear region for viewing the sheet music and an opaque or translucent region which prevents viewing of the hands on the keyboard.

U.S. Pat. No. 6,003,990 ('990 patent), which issued to Einhorn, discloses Press-On Lenses for Relieving Computer Related Eye Problems. The '990 patent describes a temporary lens for attachment to prescription eyeglasses. The temporary lens is attached to prescription eyeglasses by means of electrostatic force. The temporary lens contains optical components in a unique combination to relieve the vision problems associated with prolonged computer use.

U.S. Pat. No. 6,206,521 ('521 patent), which issued to Kindschuh discloses Eyewear That Simulates Bodily Impairments. The '521 patent describes eyewear of the invention causes a person to perceive nearby objects as being distorted such that the person cannot perform simple tasks. The eyewear comprises a goggle with an opening that spans both eyes of the person. A Fresnel lens is used to produce an eyepiece that fills the goggle opening. Different distortion effects are perceived depending on the particular area of the Fresnel lens from which the eyepiece is produced. The eyewear is particularly useful as an educational tool that simulates intoxication and other bodily impairments.

U.S. Pat. No. 6,352,345 ('345 patent), which issued to Zolten, discloses a Method of Training and Rehabilitating Brain Function Using Hemi-Lenses. The '345 patent describes a method of rehabilitation or training of targeted portions of the brain in which hemi-lenses having semi-opaque radial segments selectively blind portions of the visual processing areas of the brain to force visual processing to a particular portion of the brain which is thereby stimulated. Such rehabilitation consists of having the patient perform visual and non-visual tasks constructed to activate processing in the targeted portion of the brain. The hemi-lenses may be employed in a series of gradually increased translucency to allow the patient's visual system to adapt in stages to the rehabilitated balance between intact visual processing and relearned visual processing.

United States Patent Application No. 2005/0190341, which was authored by Russomagno et al., Opaque films are adhered electrostatically to lenses of eyewear, are used to train baseball fielders and golfers. For baseball, the films, placed on the lower parts of the lenses establish opaque areas which encourage the player to follow a ball visually throughout its entire path of travel toward the player's glove. The opaque areas may have a convex upper edge or a concave upper edge. In the latter case, the training aid can be used, without modification to train the player in batting. For golf an opaque film covers one lens, and an opaque film having a lenticular transparent opening in its upper part is placed on the other lens. The films encourage the golfer to keep his or her head down and behind the ball during the downswing.

United States Patent Application No. 2013/0222757, which was authored by Klein et al., describes an ergonomic vertical redirection vision system comprising glasses or goggles with lenses modified to include a Fresnel prism that vertically redirects light. The curved Fresnel prism is a novel curved refractive element with unique advantages compared to a flat Fresnel prism.

The curved Fresnel prism may be achromatized by the addition of an appropriate diffractive surface thereby creating a hybrid achromat or diffractive/refractive optical element (DROE). Looking through the modified eyewear will redirect the user's visual field up or down, depending on the configuration. Upward vision redirection improves ergonomics and aerodynamics for several sports including bicycle riding, swimming, downhill ski racing, and motorcycle racing. Downward vision redirection improves the ergonomics of reading a book, working on a laptop or pad computer, or taking notes in a class.

U.S. Pat. No. 8,717,425 ('425 patent), issued to author Hardison of these specifications, discloses a System for Stereoscopically Viewing Motion Pictures. Moving pictures, as may be exemplified by television programming, are viewed stereoscopically according to the system described by the '425 patent, which system necessarily comprises a visual display screen upon which may be displayed a left-to-right reversed visual display. A reflecting surface is positioned opposite the visual display screen for reflecting imagery from the visual display screen toward the viewer. The reflected imagery provides a reflected left-to-right correct visual display.

The visual display screen is spaced from the reflecting surface such that the viewer's perception of the visual display screen causes the viewer to focus on a point behind the reflecting surface at a distance increased by the distance from the display to the mirror, thereby requiring the viewer to perceive laterally offset reflections of the visual display screen at the reflecting surface. In one embodiment, a cabinet assembly enables the viewer or user to selectively position the visual display screen relative to the primary reflecting surface for enhancing the perception of depth in imagery effected by the perceived laterally offset reflections.

The present specifications are believed to define around the '854 patent in view of the '425 patent and provides an eyewear apparatus or construction specifically designed to enhance a visual perception of three-dimensional motion picture programming when watching movies, video, television programs, and the like which appear as ordinary two-dimensional programming as filmed by way of a single camera or video recorder without the requirement of the reflecting mirror and reversed screen image.

The subject eyewear apparatus is particularly designed for such programming incorporating or comprising a special lens or lenses which direct the line of sight of one or both eyes outward by 1 to 10 degrees from the normal line of sight through what might be characterized as the normal parallel alignment of flat, non-magnifying lenses. The physical principles, are to a large extend discussed in the '425 patent. However, the improvement here being addressed is that no special arrangement of the equipment is required, and a relatively inexpensive eyewear apparatus can produce the same effect. The systemic aspects of the '425 patent are relatively impractical or convoluted as compared to the present invention, as summarized in more detail hereinafter.

SUMMARY OF THE INVENTION

The present invention provides a novel technique for rendering two-dimensional imagery taken by ordinary cameras and projected onto visual display screens or similar other viewing surfaces into perceived three-dimensional images, in which depth is clearly registered by the mind by using a low cost eyewear apparatus or construction to appear to create separate, vertically aligned but horizontally displaced images for viewing by the left and right eyes.

The present invention should not be mistaken for providing true three-dimensional viewing in which the eyes see distinctly different images, and which can be ascertained by moving the head back and forth in which case the relative position of foreground and background objects will change. In the three-dimensional viewing of two-dimensional photography or cinematography, there is not sufficient visual information available to do this.

However, the brain is capable of forming the three-dimensional image from much less information, and tends to use all sorts of visual information and so forth to do so. Such information includes the relative size of objects (small implies far away), the brightness and contrast (low brightness and contrast suggest objects are distant), and the physical focus to the lenses of the eyes. Of great importance of viewing nearby objects is the difference between the images received by the left and right eyes, which defines the tracking angle to the object being viewed. This process is ubiquitous in everyday life in situations involving insufficient differences in imagery perceived by the human eye arrangement (e.g. because of large distances to the viewed objects) and the perception of depth is automatic and naturally occurring.

According to the present invention, three-dimensional viewing is limited, yet produces a markedly improved image with most of the elements of true three-dimensional viewing. This is achieved without the requirement for highly specialized eyewear, specialized television sets or assemblies, specialized filming techniques, etc. Conceivably, many possible configurations can be developed in which the novel effect can be brought to bear on the problem of producing and viewing images which appear to have depth, although made without the aid of any sort of stereoscopic equipment.

It is a primary object of the present invention to provide certain means for enabling a television watcher to watch or view visual motion picture imagery in three-dimensions from a television set, which would otherwise display visual imagery in two-dimensions by way of a low cost eyewear apparatus or construction incorporating at least one prismatic lens construction. To achieve these and other readily apparent objectives, the present invention essentially and firstly requires a primary, conventional, (flat screen) visual display screen.

Further required is an eyewear apparatus according to the present invention, which when donned, redirects or shifts a viewer's normal light of sight laterally for either the left eye or the right eye, or both eyes outwardly such that the viewer perceives two laterally offset images, which offset images are recombined via the viewer's brain processes to provide a perception of depth in the otherwise two-dimensional imagery.

A number of different prismatic lens constructions according to the present invention are attachable to or otherwise cooperable with an ordinary pair of spectacles or glasses and is central to the practice of the present invention. By way of the various prismatic lens constructions contemplated by the present invention, a method and apparatus is provided for enhancing the enjoyment of ordinary TV broadcasts, display of video recordings, and other visual material displayed on a flat screen so as to produce impression of depth, or 3D effect, by use temporary use of eyewear which are designed to direct the line of sight of one or both eyes outward from the normal alignment when focused on said screen.

The prismatic lens constructions are all designed to provide an outward angle or re-direction generally between the range of 1 and 10 degrees. The eyewear apparatus may, in certain embodiments, redirect the alignment of only one eye by a re-direction of between 1 and 10 degrees, or alternatively, may operate to redirect the alignment of both eyes by an outward angle, the sum of which two angles lies between 1 and 10 degrees.

The eyewear apparatus according to the present invention may be formed from ordinary spectacles with optically flat lenses which have been milled or molded to have an angle between the inner and outer surfaces of between 1 and 10 degrees, with the angles of the left and right lenses adding added together total between 1 and 10 degrees, with each, having a range lying between 1 and 10 degrees.

The eyewear apparatus may further comprise ordinary spectacles wherein the flat lenses have been modified by the permanent application of a thin film in which vertically disposed parallel ridges comprising a linear Fresnel lens which have been molded, pressed, etched into the film or formed by the application of a compatible optically clear deposit thereon so as to produce a similar laterally redirective effect.

A further method and apparatus according to the present invention enhances the enjoyment of ordinary TV broadcasts, display of video recordings, and other visual material displayed on a flat screen so as to produce impression of depth, or 3D effect, by use temporary use of eyewear similar to protective eyewear such as ordinary safety glasses, but large enough in dimension to be worn over ordinary prescription eyewear which is ordinarily worn by the viewer when watching television or video material on a flat screen.

A further method and apparatus according to the present invention provides an eyewear construction or apparatus constructed with two layers of flat optically clear glass or plastic with a flexible layer of optically clear plastic sandwiched between them and a mechanism such as a screw clamp affixed to one of both lenses so the outside side of either or both lenses may be tightened to compress the contained pliable layer. This multilayered lens construction thus accomplishes the effect of producing a prism of optically clear material with flat, inclined surfaces so as to redirect incident light in a direction outward to the normal line of sight through said glasses.

A further method and apparatus according to the present invention provides an eyewear construction where either one or both optically flat clear glass or plastic lenses is provided with flexible layer of optically clear plastic coating consisting of a Fresnel lens covering only the central portion of the lens in a suitable configuration to affect the redirection of the lines of sight which encompass the display screen when the eyes are focused primarily thereon, leaving the remaining field of vision unchanged. This alternative method may enhance the illusion of depth, while substantially reducing the amount of the Fresnel lens film required.

BRIEF DESCRIPTION OF THE DRAWINGS

Other features of my invention will become more evident from a consideration of the following brief description of patent drawings:

FIG. 4c is a first sequential diagrammatic top view type depiction of a visual display screen displaying a single two-dimensional image with a screen viewer's eyes positioned in anterior adjacency to the visual display screen at a select distance for viewing the two-dimensional image.

FIG. 4d is a second sequential diagrammatic top view type depiction of a screen viewer's eyes being outfitted with a right prismatic lens construction according to the present invention for re-directing the screen viewer's right line of sight laterally outwardly.

FIG. 4e is a third sequential diagrammatic top view type depiction of a visual display screen displaying a single two-dimensional image with a screen viewer's eyes positioned in anterior adjacency to the visual display screen at a select distance for viewing the two-dimensional image in laterally offset positions, the screen viewer's eyes having been outfitted with a right prismatic lens construction according to the present invention for re-directing the screen viewer's right line of sight laterally outwardly.

FIG. 4f is an anterior plan type depiction of the visual display screen otherwise depicted in FIG. 4c with a single two-dimensional dot type image being displayed thereon.

FIG. 4g is an anterior plan type depiction of the visual display screen otherwise depicted in FIG. 4e with laterally offset two-dimensional dot type images being displayed thereon.

FIG. 5a is an anterior view of an optically clear flat lens construction usable in combination with the eyewear apparatus according to the present invention.

FIG. 5b is a top edge view of the optically clear flat lens construction otherwise depicted in FIG. 5a.

FIG. 5c is a medially-directed lateral edge view of the optically clear flat lens construction otherwise depicted in FIG. 5a.

FIG. 5d is an anterior view of a first prismatic lens construction usable in combination with the eyewear apparatus according to the present invention.

FIG. 5e is a top edge view of the first prismatic lens construction otherwise depicted in FIG. 5d.

FIG. 5f is a medially-directed lateral edge view of the first prismatic lens construction otherwise depicted in FIG. 5d.

FIG. 6a is a posterior view of a second prismatic lens construction usable in combination with the eyewear apparatus according to the present invention.

FIG. 6b is a top edge view of the second prismatic lens construction otherwise depicted in FIG. 6a.

FIG. 6c is a medially-directed lateral edge view of the second prismatic lens construction otherwise depicted in FIG. 6a.

FIG. 6d is a fragmentary enlarged sectional view of the second prismatic lens construction as sectioned from FIG. 6b, the view being presented to show in greater detail the lens construction.

FIG. 7b is an edge view type depiction of the sheet of thin film material for providing an alternative prismatic lens construction otherwise shown in FIG. 7a.

FIG. 8a is a vertically oriented end view of a length of stock material otherwise depicted in FIG. 8b for providing an alternative prismatic lens construction according to the present invention.

FIG. 8b is a perspective view of the length of stock material otherwise depicted in FIG. 8a for providing an alternative prismatic lens construction according to the present invention.

FIG. 9a is a first diagrammatic end view type depiction of an upper and lower roller arrangement for forming an alternative prismatic lens construction from a length of stock material according to the present invention.

FIG. 9b is a second diagrammatic side view type depiction of the upper and lower roller arrangement otherwise depicted in FIG. 9a for forming an alternative prismatic lens construction from a length of stock material according to the present invention.

FIG. 10b is a diagrammatic lateral assembled view depicting the safety glass type eyewear apparatus according to the present invention otherwise depicted in FIG. 10a shown assembled over the pair ordinary spectacles otherwise depicted in FIG. 10a.

FIG. 11a is a first sequential diagrammatic top edge view of a multilayered lens construction according to the present invention showing an anterior material layer, a posterior material layer and an intermediate material layer in a relaxed, uncompressed state.

FIG. 11b is a second sequential diagrammatic top edge view of the multilayered lens construction according to the present invention showing the anterior material layer, the posterior material layer and the intermediate material layer in an actuated, compressed state.

DETAILED DESCRIPTION OF THE PREFERRED EMBODIMENTS

Stereoscopy (also called stereoscopic or three-dimensional (3-D) imaging) refers to a technique for creating or enhancing the illusion of depth in an image by presenting two (2) two-dimensional, offset images separately to the left and right eye of the viewer along with other visual clues as to distance. Both of the two-dimensional, offset images are then combined in the brain to give the perception of three-dimensional depth.

The purpose or primary objective of the present invention is to enable the viewer to perceive essentially the same sort of three-dimensional imagery when viewing a two-dimensional motion picture presentation on a television screen or similar device by way of certain eyewear having at least one prismatic lens construction. This is achieved by causing the viewer to focus the viewer's eyes, not on the plane of a visual display screen, but on the perceived images displayed upon visual display device.

Figure 1:
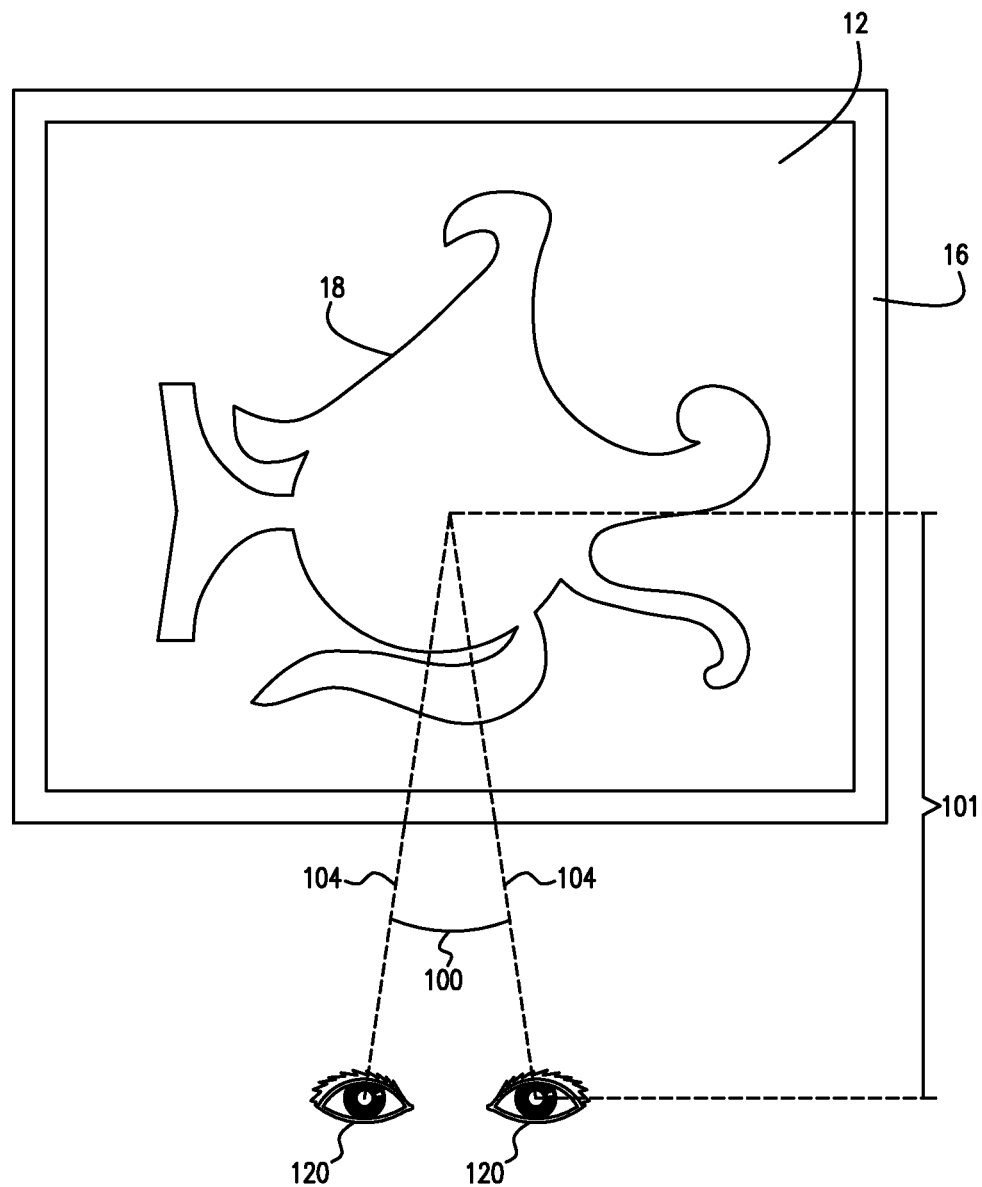
FIG. 1 is a diagrammatic or schematic depiction of a visual display screen displaying a single two-dimensional image with a screen viewer's eyes positioned in anterior adjacency to the visual display screen at a select distance for viewing the two-dimensional image.

FIG. 1 is a simplified diagrammatic type illustration showing a visual display device or screen as at 12 with a primary image 18 displayed thereupon. When a viewer watches a motion picture show such as a television program, it is very difficult for the viewer to focus the viewer's eyes anywhere but on the visual display screen 12. The term, "focus" is here intended to denote or involve two distinct physical functions.

Firstly, the lenses of the eye must adjust their focal length so that the image seen by each eye registers precisely on the retina so that the image is not blurry. This type of focal length adjustment is performed thousands of times a day without any conscious effort by individuals with reasonably normal vision. Secondly, the tracking of the eyes (i.e. the direction in which the eyes are pointed) is also directed toward the image being visually perceived.

It is readily apparent that a viewer's two eyes, being spaced a couple inches apart, do not see precisely the same view of the image or its surroundings. However, if both eyes track so as to place two images in a relationship such that the vertical dimensions are substantially the same, and the separation of the two images appears normal, the mind assembles the information from the non-identical pictures to make a best fit three-dimensional picture of the visual perception(s).

All of the imagery appearing upon the visual display screen 12 thus appears to be at the same distance from the viewer and the viewer perceives two-dimensional flat imagery 18, something akin to an animated painting, on the visual display screen 12. This process involves the two eyes 120 tracking inwardly at an angle 100 around 5 degrees given a 10 foot viewing distance as at 101. The angle 100 is, of course, lesser or shallower, given a greater distance 101 or the farther away the object is on which the eyes 120 are focused. A zero angle represents a very long or essentially infinite distance.

Figure 2:
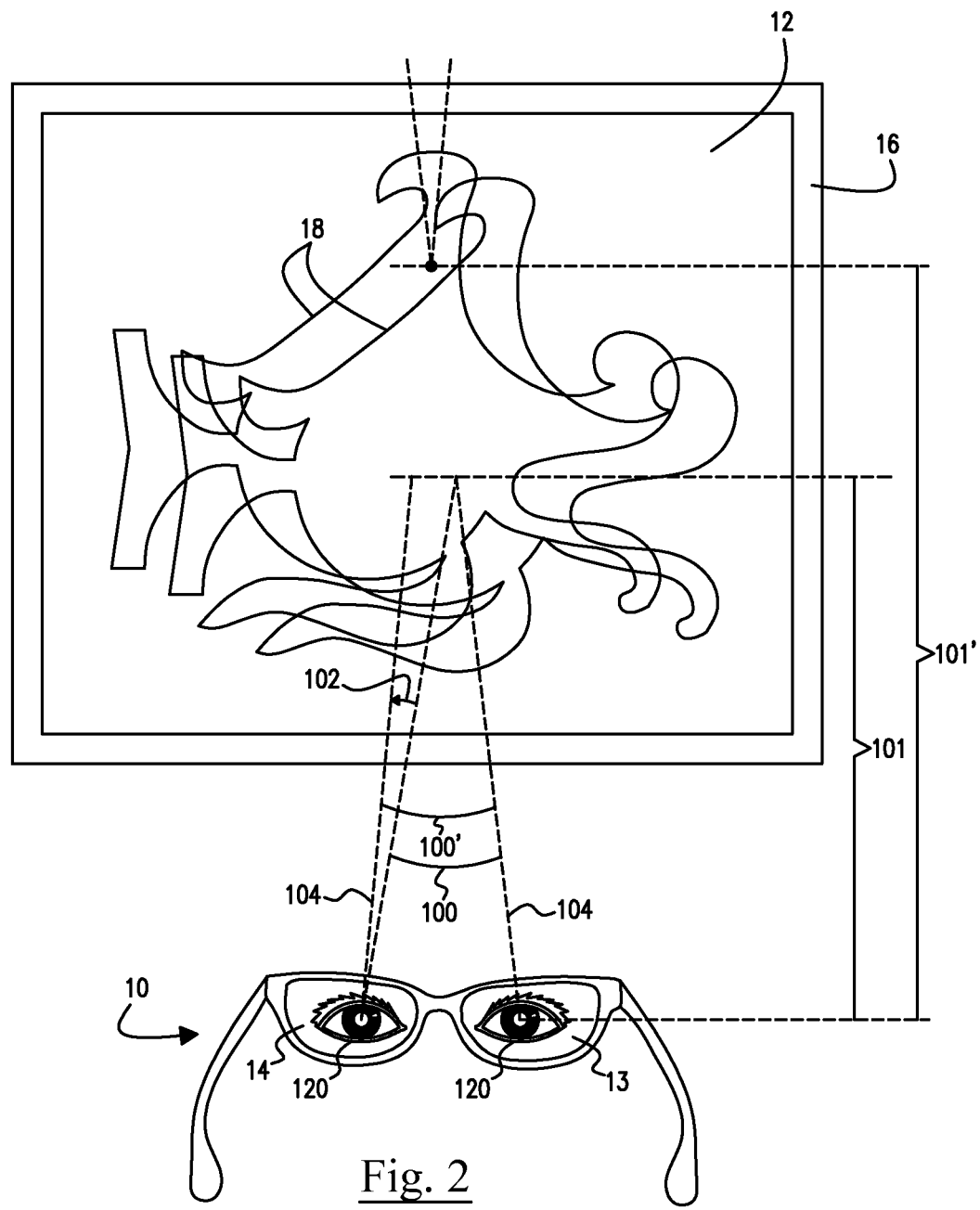
FIG. 2 is a diagrammatic or schematic depiction of a visual display screen displaying the same single two-dimensional image as shown in FIG. 1 with the screen viewer's eyes outfitted with an eyewear apparatus according to the present invention as positioned in anterior adjacency to the visual display screen at a select distance for viewing the two-dimensional image in laterally offset positions.

FIG. 2 illustrates the result of donning a pair of eyeglasses or similar other eyewear apparatus 10 according to the present invention wherein a select lens (i.e. at least one) of the first or left lens 14 and the second or right lens 13 of the eyewear apparatus 10 is outfitted with a very shallow prismatic lens construction 15, which prismatic lens construction 15 re-directs (as at arrow 102) the otherwise convergent line(s) of sight 104 of the eye(s) 120 laterally outwardly by several degrees.

The lines of sight 104 from the eyes are normally convergent upon a convergence plane 130 (as referenced in FIG. 4c) equidistant between the viewer's eyes 120 orthogonal to the distance between the two eyes 120. Comparatively referencing FIG. 1 versus FIG. 2, it will be seen that angle 100 becomes relatively narrower (as at angle 100') when the screen viewer's eyes 120 are outfitted with eyewear apparatus 10 according to the present invention.

The donning of eyewear apparatus 10 thus tracks the eyes 120 about the same as they would were the visual display screen 12 to be placed roughly 30 feet away at a perceived distance 101'. The primary images 18 seen by the two eyes 120 are considerably different, and result in a much dissimilar view of the screen-based material. This might be thought to produce a blurred picture, as generally depicted in FIG. 2. However, the mind makes corrections for this kind of mismatch continuously throughout the day every day, and viewers are entirely unconscious of them.

The picture or imagery the viewer "sees" as re-processed by the brain, is not blurred at all. Instead, the imagery simply appears as if it were farther away. There is little other indication of this, other than the illusion that the viewer is looking through the screen frame 16 of the television set of similar other device as though it were a window, and the scene on the visual display screen 12 is beyond the screen frame 16.

The mind is so adept at making such corrections that the picture or imagery is likely to appear quite normal, other than that there is the appearance of depth. This is illusionary, as there is no information in the picture or imager as to the actual distance of the objects on the screen from the camera recording the action. The reader should bear in mind that the lenses of the eyes 120 are still both focused on the actual distance 100 to the visual display screen 12 such that the eye lenses do not support the illusion of depth.

Figure 3:
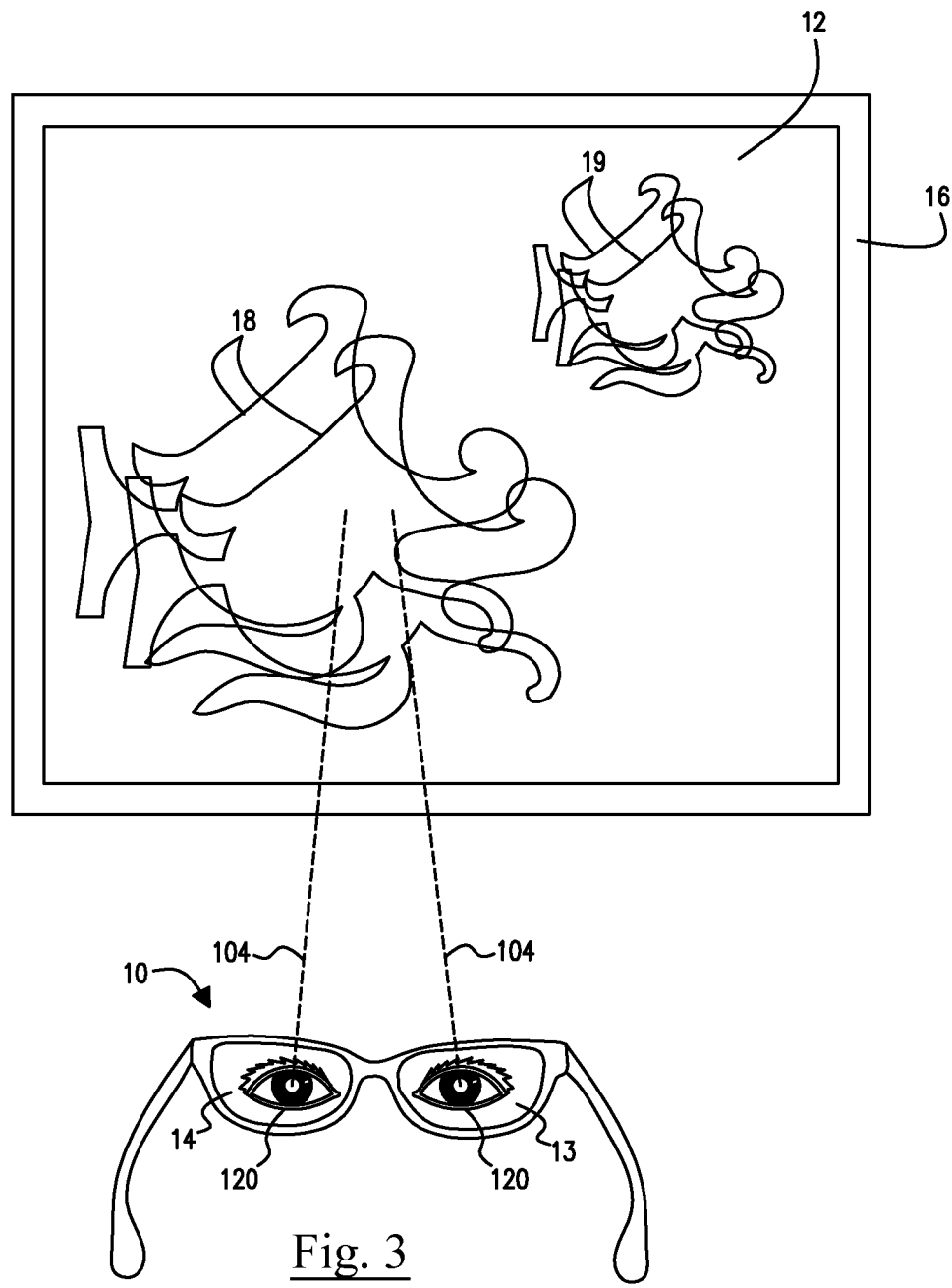
FIG. 3 is a diagrammatic or schematic depiction of a visual display screen displaying primary and secondary two-dimensional images with the screen viewer's eyes outfitted with an eyewear apparatus according to the present invention as positioned in anterior adjacency to the visual display screen at a select distance for viewing the primary and secondary two-dimensional images in laterally offset positions.

FIG. 3 attempts to depict the point that the presence of background or secondary figures or imagery as at 19 and/or action in the motion picture(s) being viewed contributes materially to the illusion of depth in the motion picture when viewed with the eyewear apparatus 10 according to the present invention. The brain processes all sorts of visual clues as to distances and relative distances and takes these into account in creating the three dimensional picture in the mind's eye that viewers are accustomed to seeing, all day long, every day. Thus, the resulting picture formed in the viewer's mind shows the smaller, dimmer object to be farther away than the larger, brighter one.

This is particularly evident or noticeable when watching athletic events on television. Citing American football games as a prime example, such televised games present most of the action at a substantial distance from the camera, so the clues as to the relative distances recorded by the camera and presented on the screen, such as relative size of the players, relative rightness of their uniforms (dimmer when they are farther away, brighter closer up), and relative movement of the players as the camera angle is changed) all contribute to the feeling of depth in the picture.

Figures 4A, 4B:
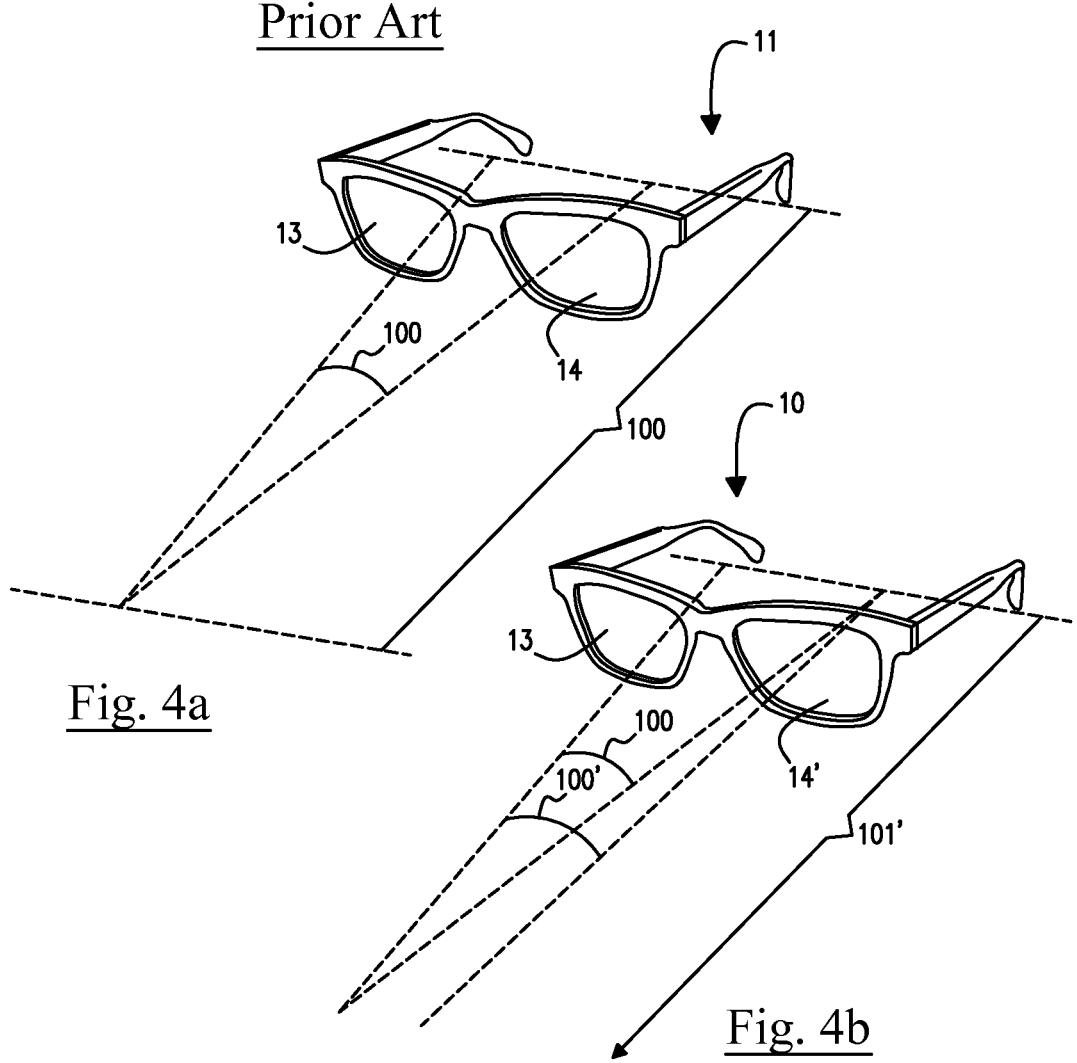
FIG. 4a is an anterior perspective view of a prior art or ordinary eyewear apparatus or construction having optically-clear, flat lenses with diagrammatic lines of sight focusing on an object a select distance from the eyewear apparatus.
FIG. 4b is an anterior perspective view of an eyewear apparatus or construction according to the present invention having a right optically-clear, flat lens construction and left prismatic lens construction with diagrammatic lines of sight focusing on an object a perceived distance from the eyewear apparatus.

FIGS. 4a and 4b are comparative depictions of two sets of spectacles or eyewear apparatuses as at 11 and 10. The ordinary pair of spectacles 11 comprises optically clear, optically flat lenses 13 and 14, which lenses do not influence the tracking of the eyes at all. The other spectacles or eyewear apparatus 10 according to the present invention are equipped or outfitted with a prismatic lens construction as at 14', which prismatic lens construction-outfitted lens 14' alters the normal angle 100 shown with spectacles 11 to altered angle 100' thereby changing the tracking to a distance 101' considerably beyond the television set or cinematic movie screen being observed.

As earlier pointed out, the exact or precise angle adjustment effected by the prismatic lens 14' is not critical to the production of the three-dimensional or 3D effect. However, excellent results have been achieved within a general range of 1 to 10 degrees with the range of 2 to 6 degrees being optimal, and thus a 2-6 degree offset as at 103 for the lens 14' is believed preferable. The reader will further please note that while the illustrations submitted in support of these specifications depict an altered or prismatic lens 14' for the left eye 120, this is not critical. Both eyes 120 could be similarly treated, with the sum of the angle offsets 103 adding to the desired or preferred range. Further, it makes no difference whether the single eye 120 treated is the dominant eye or the non-dominant eye 120.

FIGS. 4c-4g attempt to sequentially depict in a more diagrammatically correct manner, the foregoing concepts. FIG. 4c is a "before" type depiction showing a viewer's eyes 120 perceiving a primary dot type image as at 18 upon the planar visual display screen 12, which visual display screen 12 is depicted in a simplified anterior view in FIG. 4f akin to the view shown in FIG. 1. The visual display screen 12 is at an actual distance 101 from the viewer's eyes 120 (e.g. about 10 feet) and an angle 100 of about 5 degrees is subtended by eye-tracking processes as described hereinabove between the viewer's convergent lines of sight 104.

FIG. 4d depicts a prismatic lens construction 15 being introduced as at arrow 105 into the viewer's field of vision in front of the right most eye 120. The introduction 105 of the prismatic lens construction 15 operates to redirect the line of sight 104 of the right eye laterally outwardly as at arrow 106 so as to subtend an altered angle 100' intermediate the left and right lines of sight 104, thereby increasing an image distance from the actual distance 101 to a perceived distance as at 101'.

FIG. 4e is an "after" type depiction showing a viewer's eyes 120 perceiving laterally offset primary dot type imagery 18 upon the plane visual display screen 12, which visual display screen 12 is depicted in a simplified anterior view in FIG. 4g akin to the view shown in FIG. 2. The visual display screen 12 is at an actual distance 101 from the viewer's eyes 120 (e.g. about 10 feet) and the primary imagery 18' is perceived to be at perceived distance 101 ' with an angle 100' of less than 5 degrees being subtended by the viewer's convergent lines of sight 104 according to the eye-tracking processes as described hereinabove. The distance difference 110 between perceived distance 101' and actual distance 101 depends upon angle 100' as effected by the prismatic lens construction 15.

Typically, when the viewer of a television set or television assembly visually perceives imagery 18 and 19 displayed upon a visual display screen 12, the lines of sight 104 of a viewer's eyes 120 are convergently focused at the distance 101 from the viewer's eyes 120 to the visual display screen 12, and both eyes 120 see essentially the same image 18 in the same place. In FIG. 4c, the dot-shaped image 18 represents any one of the several thousand pixels the viewer sees to form the image 18.

Accordingly, in FIGS. 4c-4g, when the dot image 18 on the visual display screen 12 is viewed through the eyewear apparatus 10 according to the present invention, the image 18 appears to be, not on the surface visual display screen 12, but rather behind it (as at phantom dot image 18') at distance 110 from the visual display screen 12. Thus, the viewer focuses his or her eyes 120 beyond the surface of the visual display screen 12. This means that the two eyes 120 are not focused on the same location of the surface of the visual display screen 12 to see the image as a single dot image, but rather on two separate laterally offset points as at dot images 18.

It will thus be understood that FIGS. 4c-4g are diagrammatic depictions of an arrangement comprising visual display screen 12 whereon a single pixel or dot image 18 is selected by way of illustration. When eyewear apparatus 10 according to the present invention is worn, each eye 120 of the viewer sees the pixel/dot image 18 as a pair of laterally offset dot images 18.

The viewer perceives, not the picture comprising the pixel/dot image 18 and all of the other pixels making up the visual display or image on the visual display screen 12, but rather a dot image 18' which appears to be behind the visual display screen 12 at a distance 110 dictated by the selected offset 103. By virtue of the fact that each eye 120 sees each pixel/dot image 18 in a slightly different placement on the visual display screen 12, the brain receives visual information similar to that received when the eyes 120 are perceiving an actual three dimensional panorama.

Human eyes are typically spaced on the order of two to four inches apart (most often between 2.5 to 3 inches apart), and when focusing on objects directly in front of the viewer are both canted inward toward the object such that each eye 120 is turned slightly toward the other eye 120 or toward convergence plane 130, and the lines of sight 104 converge on the object. As indicated, this lateral rotation of the eyes 120 is one of the input signals to the brain which provide depth information. Also, the lenses of the individual eyes 120 focus by deformation of the lenses of the eyes 120 to bring the distant object into clear focus. This also provides the mental processes with information as to the distance of the various objects as focused upon.

A very important other element in the creation of the perception of depth when viewing two-dimensional motion picture material is that the eyes 120 do not receive identical pictures on the left and right retinas, but see slightly offset pictures as generally depicted in FIGS. 2, 3, and 4e. The human brain is capable of using the slight differences in the visual content of the two dimensional pictures received from each eye 120 in the construction of the three dimensional image in the brain.

Current three dimensional viewing technology utilizes all of the visual clues present in normal viewing of the world, such as relative size, brightness, parallax (the horizontal shifting of the apparent position of objects when the head is moved from side to side), it also makes use of the above characteristics of human vision to reproduce, and even exaggerate the perception of depth.

While it has long been known that the perception of depth in photographic or rendered materials can be created by forcing the two eyes 120 to see two different images which have been created by separate cameras, video cameras or artistic renderings creating two dimensional pictures taken from the perspective of the two human eyes spaced somewhat apart, it has only recently been recognized that a substantial element in the creation of the three dimensional perception can be obtained by forcing the two individual eyes to see exactly the same picture, but with the picture shifted slightly in the horizontal direction.

For example, a television set capable of processing images taken from two cameras, and shown on alternating frames of the television set with the viewer wearing the appropriate shutter glasses can be altered electronically, so as to show only a series of images taken with a single camera, but with the original picture taken by the single camera shown on the screen to be viewed with the left eye, and a slightly shifted horizontally but otherwise identical picture shown on alternate screens for viewing with the right eye.

This creates the perception of significant depth in the viewer's mind even though there is only the depth information provided by the subsidiary visual clues, such as color contrast, size, and brightness. However, for this system to produce the perception of depth in the pictures, both specially constructed television sets and special viewing glasses are required. Eyewear apparatus 10 according to the present invention provides a low cost alternative to enable users to visually perceive three-dimensional television or motion picture programming by way of simple physical principles incorporated into the apparatus 10.

To achieve this primary objective, FIGS. 5a-5f depict a first embodiment or arrangement of lenses usable in combination with the eyewear apparatus 10 according to the present invention. In other words, the eyewear apparatus 10 or 3D glasses construction according to the present invention may preferably comprise a single prismatic lens as at 26 is used as the prismatic lens construction 15.

Comparing planar lens construction 25 depicted in FIGS. 5a through 5c to prismatic lens construction 26 depicted in FIGS. 5d through 5f, the reader will note that the planar lens construction 25 comprises parallel anterior and posterior surfaces as at 20 and 21, respectively, while the anterior and posterior surfaces 20 and 21 of prismatic lens construction 26 are non-parallel having angled offset 103 in a general range of 1 to 10 degrees with a preferred range of 2 to 6 degrees.

In other words, a first flat prism construction as at lens construction 25 may be placed in a first-lens positioning portion of an ordinary pair of spectacles, and a second prismatic lens as at lens construction 26 (having two non-parallel surfaces) may be placed in a second-lens positioning portion of the ordinary pair of spectacles. The non-parallel surfaces are preferably formed such that the inner or posterior surface 21 is angled between 1 and 10 degrees relative to the outer or anterior surface 20.

The lens construction depicted FIGS. 6a-6d replaces the single prism lenses otherwise depicted in FIGS. 5a-5f with a substantially planar lens as at lens construction 27, which lens construction 27 preferably comprises narrow, vertical striations or formations (i.e. as generally referenced at peaks 28) comprising angled offsets 103 which may be either molded or machined into either optical glass or optical plastic. This type of lens has been well known since its origination by August-Jean Fresnel in 1888.

The vertical striations or formations having offset faces 29 with offsets 103 are ideal for making large Fresnel type lenses cheaply, and certain alternative versions thereof are widely used for solar panel ray focusing, and on all projection type television sets. In these latter cases, the lenses are all focused lenses, involving radial striations, and are relatively more complex from a manufacturing standpoint as compared to the relatively simple linear structures or formations described here.

Figure 7A:
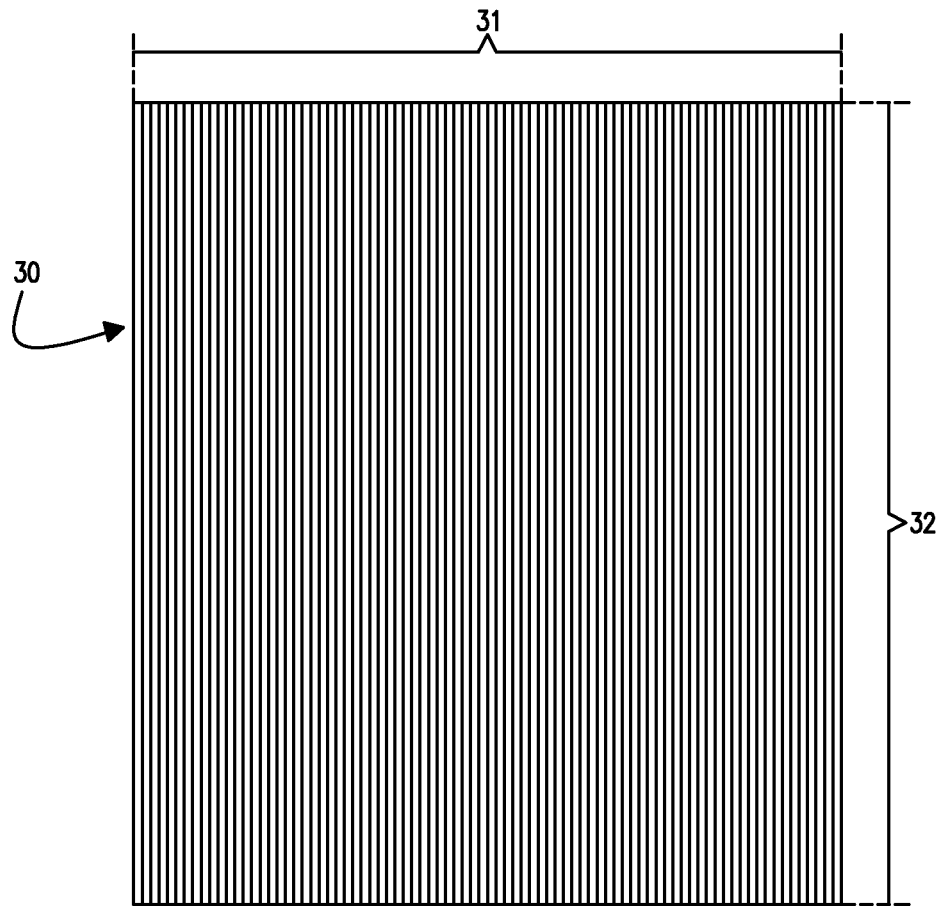
FIG. 7a is a plan type depiction of a sheet of thin film material for providing an alternative prismatic lens construction according to the present invention.
Figure 7B:
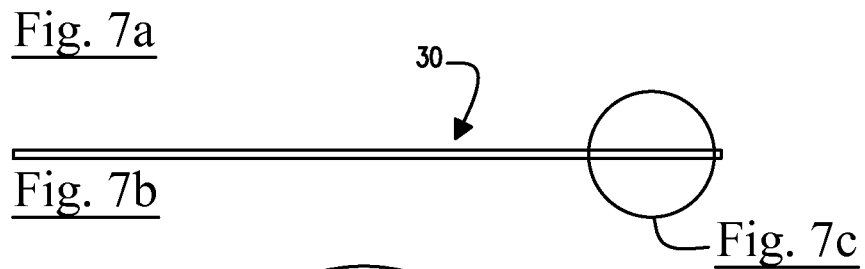
Figure 7C:
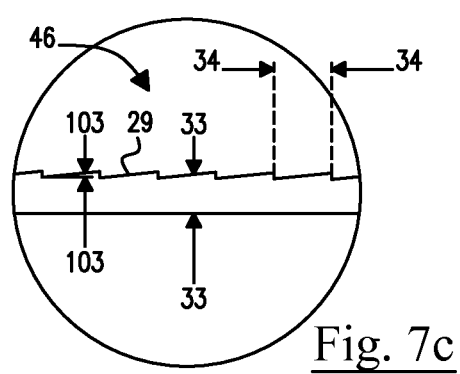
FIG. 7c is a fragmentary enlarged sectional view of the sheet of thin film material for providing an alternative prismatic lens construction as sectioned from FIG. 7b.

FIGS. 7a-7c, for example, are a series of drawings usable as a basic specification for a film material or construction as at 30, which can be permanently applied (adhered) to ordinary planar lenses as at lens construction 25 in FIGS. 5a through 5c to create much the same effect as the prism lens construction 26 in FIGS. 5d through 5f. From a cost stand point, this type of thin film construction 30 can be greatly advantageous, as the thin film material 30 can be processed through existing extrusion machinery at low cost, and applied (e.g. adhered) to ordinary clear glass or plastic planar spectacles as at lens construction 25.

Sheets measuring 1 to 10 meters in length (as at length 31) having a width of 65 to 400 millimeters in width (as at width 32) are contemplated as being exemplary. The thin film material 30 could conceivably comprise a preferred thickness of 0.3 millimeters or less (as at thickness 33) and a face width (as at width 34) of about 1 millimeter. These are but exemplary considerations, however.

A number of alternative methods of manufacture for the prismatic lens construction as generically referenced at 15 are further contemplated. A prismatic lens construction 15, for example, could conceivably be formed either as a simple prism lens as at prismatic lens construction 26 generally depicted in FIGS. 5d-5f and FIGS. 8a and 8b or a multi-faceted Fresnel type lens either embedded in a substrate or applied as a thin film.

The simple prismatic lens construction 26 may be preferably molded from prismatic glass or optical quality plastic material as at 35 and formed or cut from the molded material as at cut formations 36. The material may thus have a maximum thickness as at 37 on the order of 2-3 millimeters cut or formed from sheets having a width on the order of 30 millimeters as at width 38 with lengths of varying length as may be practical.

Alternatively, a sheet of work stock essentially twice the preferred thickness of the desired lens material (e.g. 4 to 10 mm in thickness) could be drawn through a tight-fitting opening containing a thin blade running the width of the opening so as to split the work stock into two pieces of half the overall thickness. The blade would be mounted as a slight angle to the plane of the work stock so as to produce two prism-shaped sheets of half the thickness of the of the original work stock at a slight angle to the other.

The Fresnel type lens material could conceivably be machined (physically or optically), extruded, or imprinted. A machined lens, for example, could conceivably be achieved by use of a single shaper tool with an appropriate blade angle between 1 and 10 degrees from the plane of the film stock sheet. The shaper could be programmed to make multiple passes across the work stock, with the material being advanced exactly one blade width between strokes. Alternatively, thin film Fresnel type material could conceivably be extruded by pressing a thermoplastic material through a thin, wide extrusion orifice. The extrusion orifice could be designed to include the desired shape of the Fresnel lens in the opening of the orifice.

Further, a suitable thin plastic film could conceivably be "imprinted" with rotary tools providing the necessary profile for the Fresnel lens by passing the film stock 41 between two rollers 39 and 40 driven by a single drive gear train 43 as generally depicted in FIGS. 9a and 9b. The upper roller 39 (opposite smooth-faced roller 40) in FIGS. 9a and 9b may preferably comprise a machined surface as at 42 for imprinting upon the work stock sheet 41 the desired Fresnel profile or landscape as at 46. The output profile would essentially be the same as for that shown in FIG. 7c, the length and width (as at 31 and 32 in FIG. 7a) being reversed.

Figure 10A:
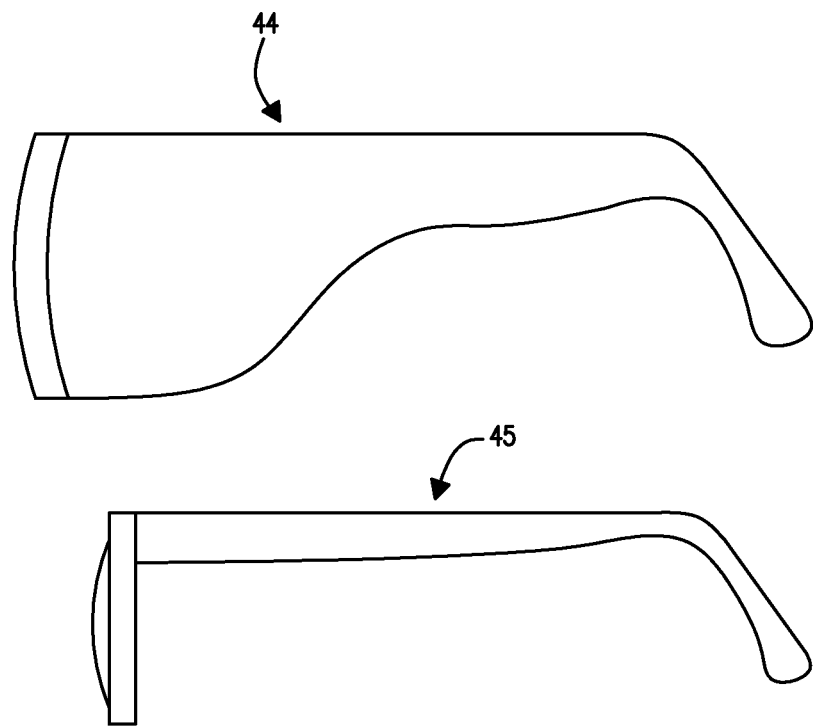
FIG. 10a is an exploded lateral view of an upper safety glass type eyewear apparatus according to the present invention being exploded from a lower pair of ordinary spectacles.
Figure 10B:
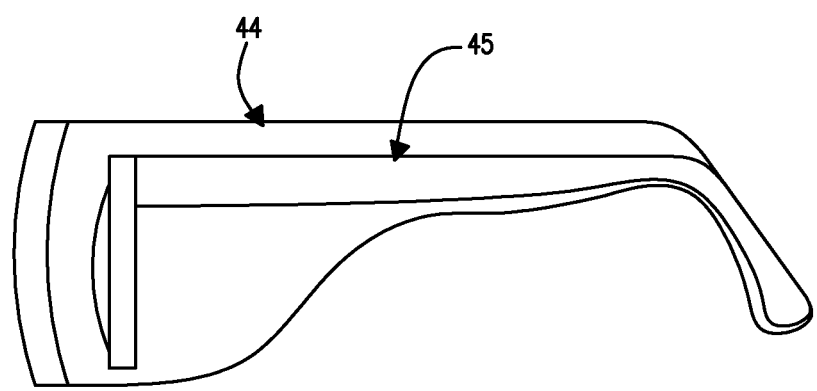

FIGS. 10a and 10b attempt to depict a further embodiment of the 3D glasses concept according to the present invention. While the generic prismatic lens construction 15 can be installed or outfitted upon ordinary commercial spectacles with planar glass lenses, it may often be more practical to modify safety glasses type eyewear as at 44 designed to be worn over ordinary eyewear as at 45 such as eyewear 45 comprising corrective lenses for remedying a select eye condition such as myopia, hyperopia, astigmatism, and presbyopia.

Eyewear or glasses 44 are currently produced and sold by the millions for use as safety glasses. FIG. 10a depicts a safety glasses type eyewear construction 44 exploded from an ordinary corrective lens type of eyewear 45. Such eyewear 44 also tends to fit rather comfortably upon a wearer who does not ordinarily wear glasses or eyewear 45. The eyewear 44 is lightweight and quite comfortable to wear for long periods of time, and may very easily be outfitted with a prismatic thin film construction having a landscape 46. A section of the material construction may thus be formed and attached (e.g. adhered) to an inner or posterior surface of either or both lenses 13/14.

Referencing FIGS. 11a and 11b, it is further contemplated that the prismatic lens construction outfitted upon or otherwise cooperable with the eyewear apparatus 10 according to the present invention may preferably comprise a multilayered lens construction as at 50. The multilayered lens construction 50 preferably comprises an anterior material layer as at 51, a posterior material layer as at 53, and an intermediate material layer as at 52.

The anterior and posterior material layers 51 and 53 are preferably formed from or comprise substantially rigid optically flat clear materials such as glass or a suitable lens grade plastic, and the intermediate material layer 52 is preferably formed from or comprises a pliable or compressible optically clear material. The intermediate material layer 52 is sandwiched between the anterior and posterior material layers 51 and 53 as generally depicted.

The intermediate material layer 52 is compressible via certain compression means (e.g. a screw clamp not specifically illustrated) as generically referenced at force vectors 150 for inclining a first select layer relative to a second select layer, the first and second select layers being selected from the group consisting of the anterior and posterior material layers 51 and 53. The first select layer is thus inclined relative to the second select layer for shifting (as at arrow 102) the user's line of sight laterally the select degree from the normal line of sight 104.

Alternatively, the Fresnel lens pattern applied to the eyewear construction of optically flat clear glass or plastic lenses may be preferably provided with a flexible layer of optically clear plastic coating consisting of a Fresnel lens patch as at 61 covering only the central portion of the lens in a suitable configuration to affect the redirection of the lines of sight which encompass the display screen when the eyes are focused primarily thereon, leaving the remaining field of vision unchanged. This alternative method may well function to enhance the illusion of depth, while substantially reducing the amount of the Fresnel lens film required.

Figure 12A:
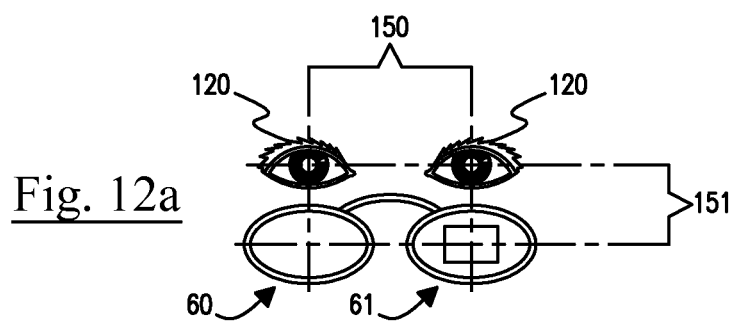
FIG. 12a is a schematic depiction of a user's eyes juxtaposed in posterior adjacency to an alternative eyewear apparatus according to the present invention wherein the alternative eyewear apparatus comprises a Fresnel patch affixed to a lens of the eyewear apparatus.
Figure 12B:
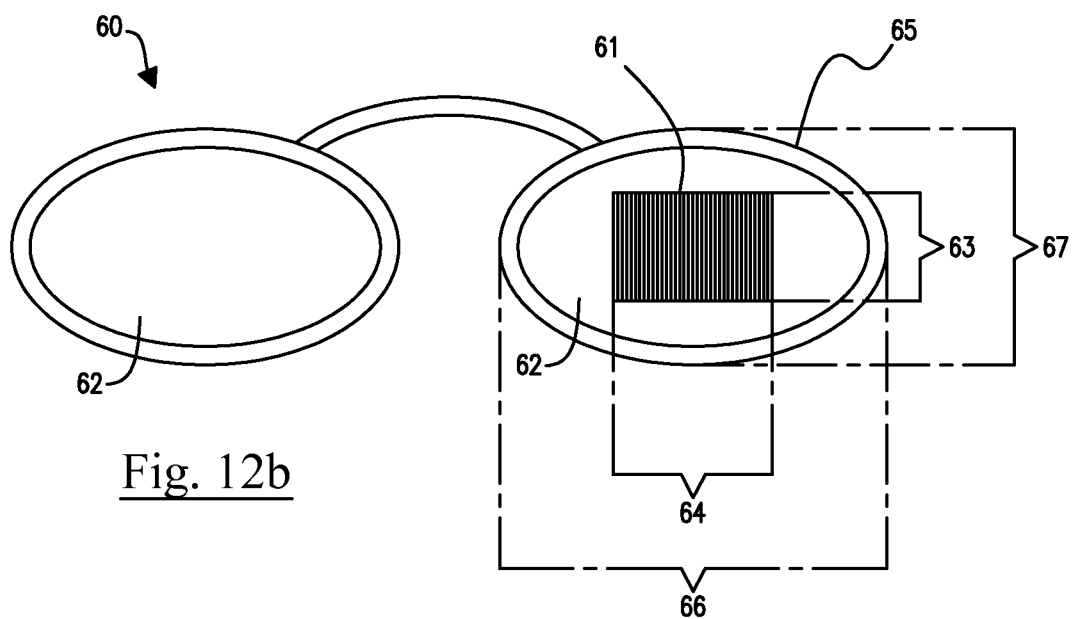
FIG. 12b is an enlarged anterior view of the alternative eyewear apparatus otherwise depicted in FIG. 12a. depicting in greater clarity a Fresnel patch affixed to a lens of the eyewear apparatus.
Figure 13:
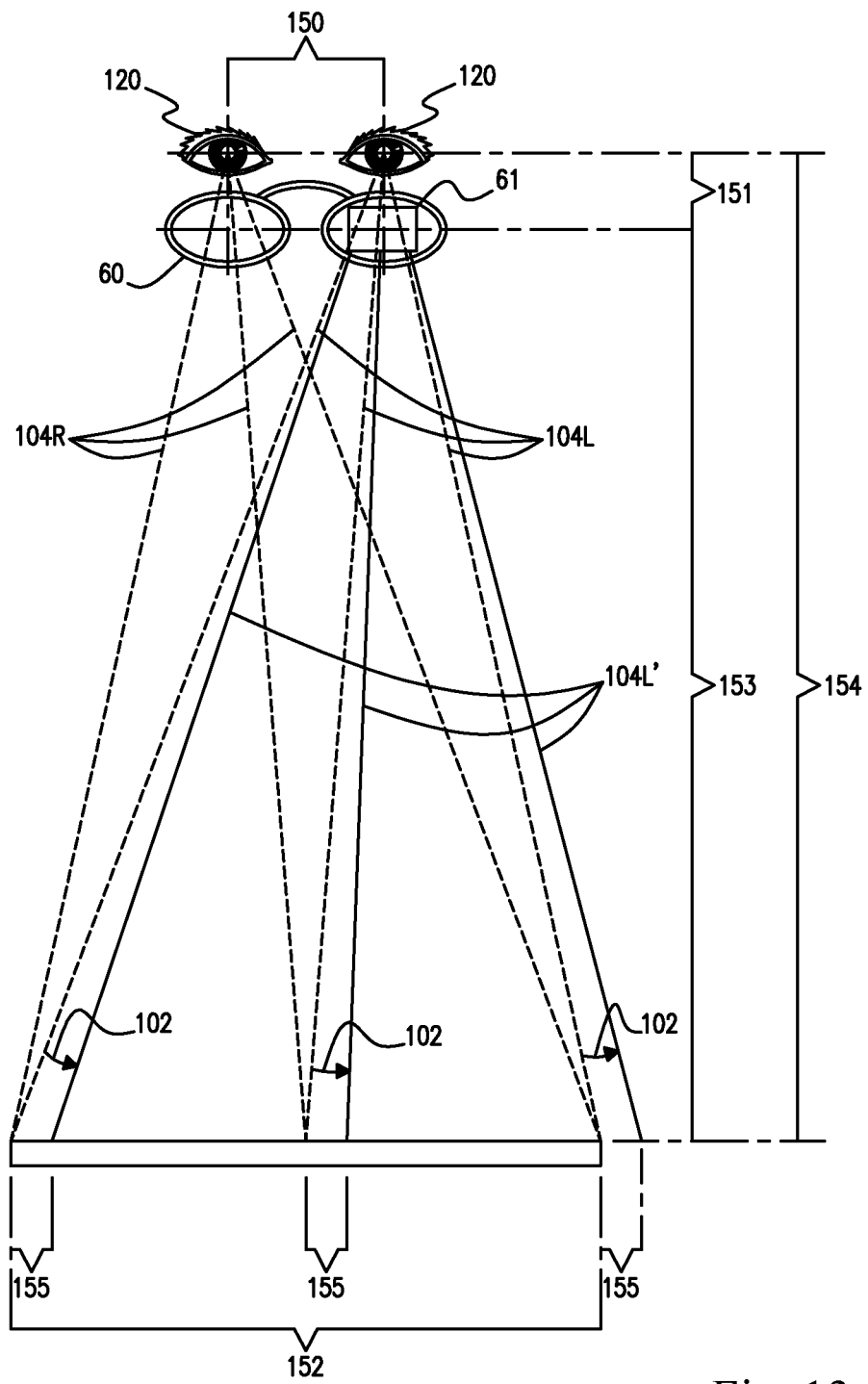
FIG. 13 is a diagrammatic or schematic depiction of a user's eyes juxtaposed in posterior adjacency to an alternative eyewear apparatus according to the present invention wherein the alternative eyewear apparatus comprises a Fresnel patch affixed to a lens of the eyewear apparatus depicting original and redirected lines of sight enabled by way of the alternative eyewear apparatus.

Referencing FIGS. 12a through 13, the reader will there note certain depiction of an alternative eyewear apparatus 60 according to the present invention. The alternative eyewear apparatus 60 basically comprises a centrally located (rectangular) Fresnel lens patch 61. Referencing FIG. 12a, in particular, the reader will note that the basic distance 150 between a user's eyes 120 is about two inches, and that the basic distance 151 between a user's eyes and eyewear apparatus 60 in on the order of about one inch.

Referencing FIG. 12b, the reader will there consider optically clear glass or eyewear grade plastic lenses as at 62, and a left or viewer's right lens outfitted with a Fresnel lens patch 61 having certain preferred or exemplary dimensions as at height dimension 63 and width dimension as at 64. The elliptical lens-retaining frame construction 65 comprises a major axis dimension as at 66 and a minor axis dimension as at 67. In this exemplary figure, dimension 63 may preferably be 0.75 inches; dimension 64 may preferably be 0.5 inches; dimension 66 may preferably be 2.5 inches; and dimension 67 may preferably be 1.5 inches.

Referencing FIG. 13, the reader will there consider normal or original lines of sight for the right eye as at 104R and normal or original lines of sight for the left eye as at 104L. The visual display screen 12 in this example preferably comprises a 48-inch width as at screen width 152, and is spaced from the alternative eyewear apparatus 60 a distance 153 of 119 inches and is spaced from the user's eyes 120 a distance 154 of 120 inches. The normal lines of sight 104L are shifted (as at arrow 102) to the left (or the reader's right) as at redirected lines of sight 104L' a distance 155 of about 3 inches via the Fresnel lens patch 61.

Eyewear apparatus 60 is preferably formed by affixing to one lens of a pair of flat glasses, not a full sized film coating containing the Fresnel lens construction, but instead applying to the clear lens a smaller piece of film, centrally located, so as to essentially cover only the user's view of the display screen 12 when looking toward it. Alternative eyewear apparatus 60 thus basically serves two purposes. Firstly, the alternative eyewear apparatus 60 according to the present invention produces two separate images for viewing separately by the two eyes 120 as previously discussed. The illusion of depth thus is unaffected when the viewer's lines of sight 104 are focused on the screen; the double vision effect for the remainder of the surroundings, however, is eliminated.

This Fresnel lens patch 61 thus renders the appearance of depth in the picture on the display screen 12 more like it would be were the viewer looking through a window at the action beyond, thereby enhancing the illusion of depth. Secondly, the amount of Fresnel lens film required for each set of eyewear is greatly reduced from approximately 6 square inches per lens to about one quarter of a square inch per lens thus providing a significant material cost savings.

It will thus be understood that an alternative eyewear apparatus according to the present invention may thus preferably comprise a prismatic surface (which shifts the wearers line of sight 104 for one or both eyes so as to produce the appearance of depth) comprises the entire surface of the lens. Alternatively, eyewear apparatus, as at apparatus 60, may comprise a prismatic surface (which shifts the wearers line of sight for one or both eyes so as to produce the appearance of depth comprises) that is a limited portion of said lens but which encompasses all of the lines of sight from the eye to the display screen, with the remainder of the lens consisting of optically flat material so as to limit the distortion of depth for much of the visual field outside the display screen.

It will be recalled that the comfortable viewing range of the viewer in front of a television surface may be on the order of 10 feet or so. With human eyes spaced on the order of two to four inches apart (most often between 2.5 to 3 inches apart) or so, it is contemplated that an offset 103 generally between 1 to 10 degrees, and particularly between 2 and 6 degrees, provides excellent three-dimensional perceptions according to the eyewear apparatus of the present invention.

Greater or lesser distances have been found to satisfy the requirements for viewing two-dimensional motion picture material with a significant perception of depth. The images so perceived with a significant degree of depth are, of course, influenced by the composition of the picture, and to a lesser extent by the characteristics of the photographic optics involved. For example, picture of scenes or actions containing a wide dispersion of objects dispersed between the foreground and the background will provide many more clues for the mind to work with in creating a convincing perception of depth than will a scene which involves only foreground characters with, say, a blank wall behind them.

Also, cameras set to a relatively flat focus, which makes both foreground and background objects sharply defined will produce better depth perception than will a narrow focus which causes objects closer to or farther from objects at the focal distance to be less clearly defined. Viewing condition which enhance the perception of depth when viewed by means of the subject invention include using a darkened room, such that the primary television receiver screen is much brighter than the surrounding objects, such that there is little to distract the viewer from focusing his eyes on the image of the screen.

The human eye arrangement is accustomed to viewing images which are separated only slightly for objects in the near distance and scarcely at all for far away objects. The human eye arrangement perceives the separation as clues to the distance of the object, and therefore as the perception of depth in the image. The human brain fills in the details, so to speak, and does so when the objects are too far away to provide any clear cut separation between the two images.

While the above description contains much specificity, this specificity should not be construed as limitations on the scope of the invention, but rather as an exemplification of the invention. For example, it is contemplated that the present invention may be said to essentially provide a system of elements for enabling a user or viewer to view three-dimensional motion pictures otherwise presented upon a two-dimensional motion picture display assembly as at visual display screen 12.

Viewed systemically, the present invention is believed to provide a system for enabling a user to view three-dimensional television programs, or other pictorial displays, without the need for special means of preparation of visual material or the need for electronic alternation of the display device, which system preferably comprises, in combination a visual display screen as at 12 and an eyewear apparatus according to the present invention.

The visual display screen basically functions to display images or imagery as at 18 and may preferably be exemplified by comprising a conventional flat panel television screen or a computer monitor screen. The eyewear apparatus 10 preferably comprises a first lens as at 13 or 14, and a second lens as at 14 or 13. A select lens selected from the group consisting of the first and second lenses preferably comprises a prismatic lens construction according to the present invention. The prismatic lens construction basically functions to shift or re-direct a screen viewer's line of sight laterally a select rotational degree from a normal convergent line of sight.

The select lens, comprising the prismatic lens construction according to the present invention thus causes the viewer to focus the viewer's eyes on the visual display screen and requires the viewer to perceive slightly offset images displayed upon the visual display screen accomplishing sufficient separation of the views received by left and right eyes of the viewer to create the perception of depth in the images displayed on the visual display screen.

The select rotational degree or offset may be preferably and generally selected from the range of degrees, the range of degrees being from 1 degree to 10 degrees, with a preferred select range of degrees being from 2 to 6 degrees. The select lens construction may be either limited to a single lens as selected from the group consisting of the first and second lenses, or defined by both the first and second lenses such that the sum of rotation degrees sum to a degree range as exemplified by the foregoing.

Notably, the normal lines of sight of the viewer are convergent toward convergence plane 130. The prismatic lens construction according to the present invention basically functions for shifting or re-directing a screen viewer's line (or lines) of sight laterally a select rotational degree away from the convergent normal line (or lines) of sight.

The eyewear apparatus 10 according to the present invention is also preferably cooperable with a viewer's corrective lenses, which corrective lenses are typically designed to remedy a select eye condition, the select eye condition being selected from the exemplary group consisting of myopia, hyperopia, astigmatism, and presbyopia. In this regard, the select lens itself may preferably comprise or otherwise be compatible with a corrective lens construction for remedying a select eye condition as selected from the exemplary group consisting of myopia, hyperopia, astigmatism, and presbyopia.

The foregoing considerations are further believed well able to support a method for stereoscopically viewing motion pictures or for enabling a user to view moving pictures stereoscopically. The method may be said to preferably comprise the step of providing an eyewear apparatus according to the present invention, which eyewear apparatus comprises a first lens and a second lens. The method may be said to further comprise the step of providing a prismatic lens construction.

A select lens may thus be outfitted with the prismatic lens construction, which select lens may be selected from the group consisting of the first and second lenses. A screen viewer's line of sight may thus be shifted or re-directed laterally a select rotational degree from a normal line of sight via the prismatic lens construction.

The viewers' eyes may thus simultaneously (a) focus on a visual display screen and (b) perceive offset images displayed upon the visual display screen. By focusing on the visual display screen and perceiving offset images displayed upon the visual display screen, sufficient separation of the views received by left and right eyes of the viewer is accomplished to create the perception of depth in the images displayed on the visual display screen and the images displayed on the visual display screen are viewed stereoscopically.

The normal lines of sight of the viewer are convergent as earlier described, and the prismatic lens construction(s) according to the present invention operate to shift or redirect a screen viewer's line of sight laterally a select degree away from a convergent normal line of sight. The eyewear apparatus may be made cooperable with a viewer's corrective lenses (e.g. by providing eyewear 44 wearable over eyewear 45), which corrective lenses may be said to remedy a select eye condition. The select lens may alternatively itself comprise a corrective lens construction.

The eyewear apparatus according to the present invention may preferably comprise an ordinary pair of spectacles with optically flat lenses which have been milled or molded to have an angle between the inner and outer surfaces of between 1 and 10 degrees, with the angles of the left and right lenses, when added together totaling between 1 and 10 degrees, with each, having a range lying between 1 and 10 degrees.

The eyewear apparatus according to the present invention may also preferably comprise a pair of ordinary spectacles wherein the flat lenses have been modified by the permanent application of a thin prismatic film in which vertically disposed parallel ridges form a linear Fresnel type lens construction, which have been molded, pressed, or otherwise etched into the film so as to produce a lateral shift in a user's line of sight as described in greater detail hereinabove.

The eyewear apparatus according to the present invention may further preferably comprise eyewear similar to ordinary safety glasses as at eyewear 44, which eyewear are sized and shaped to be worn over ordinary prescription or corrective lens eyewear as at eyewear 45 ordinarily worn by the viewer when watching television or video material on a flat screen as at visual display screen 12.

A further method and apparatus according to the present invention may be practiced by providing an eyewear apparatus as at 10, which eyewear apparatus 10 preferably comprises two layers of flat optically clear glass or plastic as at layers 51 and 53, with a flexible or compressible layer of optically clear polymeric material as at 52 sandwiched between the layers 51 and 53. Certain compression means as exemplified by a screw clamp (not specifically shown) may be affixed to one or both multilayered lens construction 50 such that the laterally outer side as at arrow 140 of either or both multi-layered lens construction(s) 50 wherein the layers 51 and 53 are compressed toward one another as at arrows 150 to compress the contained pliable or compressible layer 52.

By so compressing the layer 52, the effect of producing a prismatic lens construction of optically clear material with flat, relatively inclined surfaces as at anterior surface 54 and posterior surface 55 of the compressed multilayered lens construction 50. The relatively inclined surfacing 54 and 55 basically functions to redirect incident light in a direction outward to the normal line of sight 104 via the manually induced offset 103 via said compression means through the outfitted eyewear apparatus 10 according to the present invention.

Accordingly, although the invention has been described by reference to certain preferred and alternative embodiments, and certain methodology, it is not intended that the novel disclosures herein presented be limited thereby, but that modifications thereof are intended to be included as falling within the broad scope and spirit of the foregoing disclosure, the following claims and the appended drawings.

I claim:

1. An eyewear apparatus in combination with a motion picture screen, for modified viewing of ordinary television broadcasts, display of video recordings and other motion picture visual material displayed on a flat screen as two dimensional visual material created by a single camera or video recorder, but perceived by a viewer as having two laterally offset images so as to produce the impression of depth, or three dimensional viewing;

the motion picture screen displaying visual material created by a single camera or video recorder, the visual material being a single image or series of images that is viewable by a user and not distorted when viewed without the eyewear apparatus;

the eyewear apparatus comprising: a left and right lens, the left and right lens comprising a single solid refractory element, each mounted in a suitable structure for convenience of a viewer, at least one of which said lenses utilizes a prismatic lens construction which shifts the wearers line of sight laterally outwardly by a select degree from the normal convergent alignment automatically assumed by the eyes when viewing the display screen by altering the angle of the light exiting the lens with respect to the angle of entrance, causing the viewer to perceive an image offset laterally from that which would ordinarily be seen by that eye, causing the two eyes to experience as greater than normal offset of the two images which would ordinarily be associated with the viewing of objects at a considerably greater distance from the viewer than the visual display screen, and causing the viewer to perceive the appearance that the visual objects displayed on the screen are at a considerably greater distance from the viewer than the actual distance to the screen, thus causing the viewer to perceive a single image with depth.

2. The eyewear apparatus of claim 1 wherein the prismatic surface which shifts the wearers line of sight for one or both eyes so as to produce the appearance of depth comprises the entire surface of the lens.

3. The eyewear apparatus of claim 1 wherein the prismatic surface which shifts the wearers line of sight for one or both eyes so as to produce the appearance of depth comprises as limited portion of said lens which encompasses all of the lines of sight from the eye to the display screen, with the remainder of the lens consisting of optically flat material so as to limit the distortion of depth for much of the visual field outside the display screen.

4. The eyewear apparatus of claim 1 wherein the select degree of shift of the line of sight of the prismatic lens construction is between 1 degree and 10 degrees.

5. The eyewear apparatus of claim 1 wherein the prismatic lens construction is limited to either the left eye or the right eye.

6. The eyewear apparatus of claim 1 wherein the user's normal lines of sight are convergent, and the prismatic lens construction shifts the user's line of sight laterally and outwardly a select degree away from the convergent normal line of sight; and
   wherein the motion picture screen being a visual display screen, displaying two-dimensional imagery.

7. The eyewear apparatus of claim 1 wherein the eyewear apparatus is cooperable with a viewer's corrective lenses, the viewer's corrective lenses for remedying a select eye condition.

8. The eyewear apparatus of claim 1 wherein the select lens comprises a corrective lens construction, the corrective lens construction for remedying the user's specific vision deficiency.

9. The eyewear apparatus of claim 1 wherein the prismatic lens construction comprises a multilayered lens construction, the multilayered lens construction comprising an anterior material layer, a posterior material layer, and an intermediate material layer, the anterior and posterior material layers comprising substantially rigid optically flat clear material, the intermediate material layer comprising a compressible optically clear material, the intermediate material layer being sandwiched between the anterior and posterior material layers, the intermediate material layer being compressible by inclining a first select layer relative to a second select layer by mechanical means, the first and second select layers being selected from the group consisting of the anterior and posterior material layers, the first select layer being inclinable relative to the second select layer for shifting the user's line of sight laterally the select degree from the normal line of sight.

10. The eyewear apparatus of claim 1 wherein the prismatic lens construction of either or both lenses comprises a support member consisting of an optically clear structural support to which is affixed a centrally located thin film containing a Fresnel lens pattern, the Fresnel lens pattern having a height and a width each ranging from 0.5 to 0.75 inches, effectively duplicating the function of a simple prismatic lens.

11. A method for enabling a user to view moving pictures made for display on conventional display screens with no enhancement to produce the illusion of depth, as three dimensional pictures comprising the steps of:

providing a the motion picture screen displaying visual material created by a single camera or video recorder, the visual material being a single image or series of images that is viewable by a user and not distorted when viewed without the eyewear apparatus;

providing an eyewear apparatus comprising a left and right lens, the left and right lens comprising a single layer of refractory material, each mounted in a suitable structure for convenience of a viewer, at least one of which said lenses utilizes a prismatic lens construction which shifts the wearers line of sight laterally outwardly by a select degree from the normal convergent alignment automatically assumed by the eyes when viewing the display screen, causing the viewer to perceive an image offset laterally from that which would ordinarily be seen by that eye, causing the two eyes to experience as greater than normal offset of the two images which would ordinarily be associated with the viewing of objects at a considerably greater distance from the viewer than the visual display screen, and causing the viewer to perceive the appearance that the visual objects displayed on the screen are at a considerably greater distance from the viewer than the actual distance to the screen, thus causing the viewer to perceive the a single image with depth or a third dimension in the viewed scene.

12. The method of claim 11 wherein the user's normal lines of sight are convergent and the prismatic lens construction shifts the viewer's lines of sight laterally outward to create the illusion of depth in the viewed material; and
   wherein the motion picture screen being a visual display screen, displaying two-dimensional imagery.

13. The method of claim 11 wherein the prismatic lenses are built into a support system compatible with the use of ordinary corrective lenses or glasses worn by the viewer for the correction of optical problems.

14. The method of claim 13 where the prismatic lens construction of one or both lenses are combined with optical lens corrections for correcting vision deficiencies of the specific user.

15. The method of claim 11 wherein the prismatic lens construction comprises a multilayered lens construction, comprising in turn an anterior layer, a posterior layer, and an intermediate material layer, the anterior and posterior layers consisting of rigid optically flat clear material, and the intermediate layer comprising a compressible optically clear material, the intermediate layer being sandwiched between the anterior and posterior layers, the method further comprising the steps of:
   selectively compressing the intermediate material layer by inclining the relative positions of the anterior and posterior layers by mechanical means to attain a trapezoidal shape of the interior layer with the two planar surfaces deformed from their normal parallel disposition to a select angle, between 1 degree and 10 degrees so as to form an prismatic element suitable for use as a lens for shifting the line of sight through the composite by 1 degree to 10 degrees as required for the prismatic lens.

16. The eyewear apparatus of claim 4 wherein the select degree of shift of the line of sight of the prismatic lens construction is between 2 degrees and 6 degrees.

17. The eyewear apparatus of claim 1 wherein the select lens construction is applied to both eyes, such that the sum of the degrees of shift of the line of sight for each of the eyes individually totals 1 degree to 10 degrees.

18. The eyewear apparatus of claim 17 wherein the select lens construction is applied to both eyes, such that the sum of the degrees of shift of the line of sight for each of the eyes individually totals 2 degrees to 6 degrees.

19. The eyewear apparatus of claim 1 wherein the left and right lens are formed of a solid and have mirrored symmetry.

20. An eyewear apparatus for modified viewing of ordinary television broadcasts, display of video recordings and other motion picture visual material displayed on a flat screen as two dimensional visual material having two offset images created so as to produce the impression of depth, or three dimensional viewing, the eyewear apparatus comprising:

a left and right lens, the left and right lens comprising a refractory material, each mounted in a suitable structure for convenience of a viewer, one or both of which said lenses utilizes a prismatic lens construction which shifts the wearers line of sight laterally outwardly by a select degree from the normal convergent alignment automatically assumed by the eyes when viewing the display screen, causing the viewer to perceive an image offset laterally from that which would ordinarily be seen by that eye, causing the two eyes to experience as greater than normal offset of the two images which would ordinarily be associated with the viewing of objects at a considerably greater distance from the viewer than the visual display screen, thus causing the viewer to perceive the illusion not of two laterally displaced images, but of a single image with depth; wherein the prismatic lens construction of either or both lenses comprises a support member consisting of an optically clear structural support to which is affixed a centrally located thin film containing a Fresnel lens pattern, the Fresnel lens pattern having a height and a width each ranging from 0.5 to 0.75 inches, effectively duplicating the function of a simple prismatic lens.

* * * * *